United States Patent [19]
Yamazaki et al.

[11] Patent Number: 5,957,249
[45] Date of Patent: *Sep. 28, 1999

[54] ROTATING COOLING WHEEL AND METHOD OF MANUFACTURING THE SAME AND DRUM BRAKE

[75] Inventors: Ichirou Yamazaki, Komae; Tsutomu Hamabe, Fujisawa, both of Japan

[73] Assignee: Nissan Motor Co., Ltd., Yokohama, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/738,115

[22] Filed: Oct. 25, 1996

[30] Foreign Application Priority Data

Dec. 25, 1995 [JP] Japan .................................. 7-337291

[51] Int. Cl.$^6$ .............................. F16D 65/10; F16D 65/78
[52] U.S. Cl. ............................... 188/218 XL; 188/218 R; 188/264 AA
[58] Field of Search ..................... 188/218 XL, 264 AA, 188/218 A, 18 A, 264 A, 218 R

[56] References Cited

U.S. PATENT DOCUMENTS

| | | | |
|---|---|---|---|
| 4,523,666 | 6/1985 | Murray | 188/218 XL |
| 5,137,123 | 8/1992 | Setogawa et al. | 188/264 AA |
| 5,139,117 | 8/1992 | Melinat | 188/264 AA X |
| 5,492,205 | 2/1996 | Zhang | 188/218 XL |

*Primary Examiner*—Peter M. Poon
*Attorney, Agent, or Firm*—Foley & Lardner

[57] ABSTRACT

In the ventilated holes of the brake ventilated rotor are formed seven thick portions each having equal mass and separated at an equal distance in the circumferential direction from a reference line which is an arbitrary diameter, six thick portions each having equal mass and separated at an equal distance in the circumferential direction from the same reference line, five thick portions each having equal mass and separated at an equal distance in the circumferential direction from the same reference line, and four thick portions each having equal mass and separated at an equal distance in the circumferential direction from the same reference line. In other words, in the ventilating holes of the ventilated rotor are formed a plurality of thick portions which can be classified into four groups, each group having equal mass. The thick portions in respective groups are arranged at an equal distance in the circumferential direction.

10 Claims, 30 Drawing Sheets

FIG.2A
PRIOR ART
FIG.2B
PRIOR ART
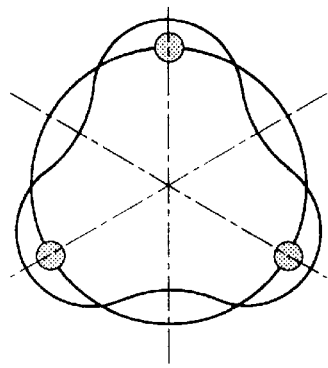
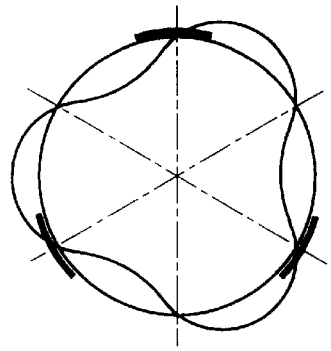
FIG.3
PRIOR ART
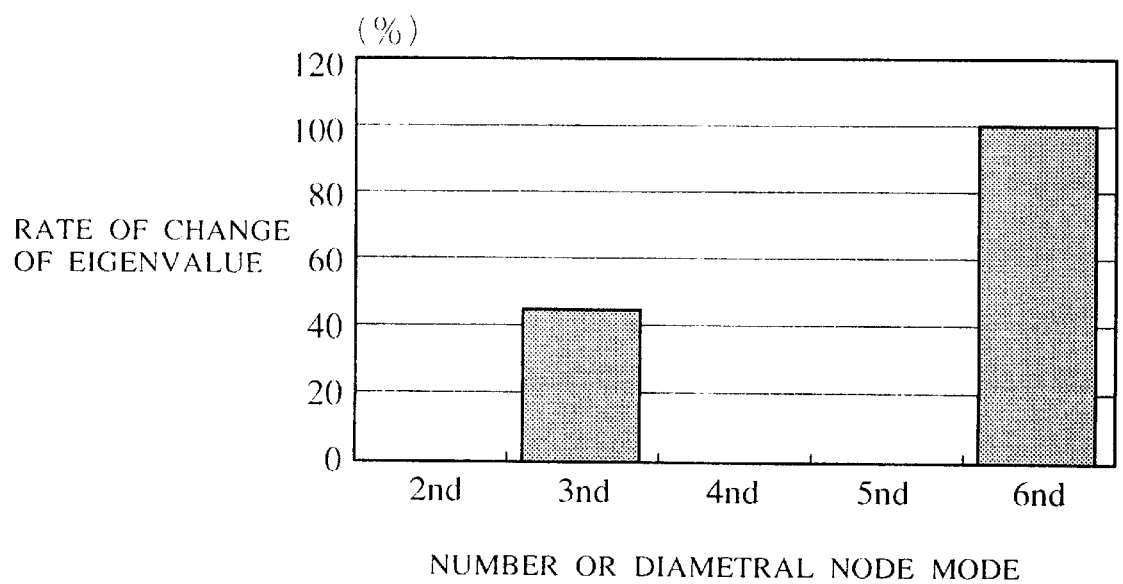

ROTATING COOLING WHEEL AND METHOD OF MANUFACTURING THE SAME AND DRUM BRAKE

BACKGROUND OF THE INVENTION

1. Field of the Invention

The present invention relates to improvements in a rotating cooling wheel such as a brake drum or disk rotor for use in braking devices such as drum brakes or disk brakes, a method of manufacturing the same, a drum brake and, more particularly, to improvements in vibration characteristics of the rotating cooling wheel to reduce so-called brake noises.

2. Description of the Related Art

The drum brake is one of the conventional brake devices. The drum brake is applied by making use of friction force caused when linings which are stuck on substantially circular brake shoes supported to a member on the car body side are forced to contact to an inner peripheral surface of a substantially cylindrical brake drum which acts as a rotating cooling wheel rotated together with a wheel.

More particularly, in the drum brake, anchors are secured to a back plate fixed on the car body side to be positioned in the inside of the inner peripheral surface of the brake drum and receive braking torque. The opposing ends of a pair of brake shoes are fitted swingably to the anchors. Respective pieces of a pair of brake shoes are arranged along the inner peripheral surface of the brake drum. When the brake is not applied, the linings stuck on the outer surfaces of the brake shoes are opposed to the inner peripheral surface at a predetermined distance.

A wheel cylinder and a return spring are provided to the other ends of a pair of brake shoes which are opposed to each other on the side opposite to the anchors side. When hydraulic pressure is supplied to the wheel cylinder, a pair of pistons which are provided to move back and forth in the lateral direction are displaced to extend. Accordingly, the other ends of a pair of brake shoes are opened laterally to be pushed to the inner peripheral surface, so that the linings are pushed to contact the inner peripheral surface $1a$. A rotating force of the brake drum is converted into frictional heat in their contacting areas to thus apply the brake.

In the drum brake of this type, frictional vibration caused on frictional surfaces when frictional heat is generated by forcing the linings to contact to the inner peripheral surface of the brake drum would vibrate the brake drum to thus excite natural vibration of the brake drum. As a result, unpleasant brake noises would be generated in some cases.

The cylindrical body, circular disk, or the like having the same thickness, like the ordinary brake drum, has its eigenmode to exhibit a vibration mode in which the outer peripheral portion bending-vibrates to generate, for example, diametral two-node mode (see FIG. 1A), diametral three-node mode (see FIG. 1B), diametral four-node mode (see FIG. 1C), diametral five-node mode (see FIG. 1D), diametral six-node mode (see FIG. 1E), or the like. Multiple roots are always included in the eigenmode since the brake drum is symmetrically formed with a center axis of rotation (i.e., an axis extending in the direction perpendicular to a face of the drawing sheet to pass through a center of the brake drum in FIG. 6) as a center. The expression "multiple roots are included" means that other eigenmode having the same profile which is shifted in phase by a half period in the circumferential direction is present at the same frequency in addition to one eigenmode respectively shown in FIGS. 1A to 1E.

More particularly, if the peripheral surface of the brake drum is vibrated in its stationary state, it seems that a plurality of eigenmodes are present on the brake drum since, even if any position is selected as an excitation point in the circumferential direction, such a response mode appears that the excitation point always serves as an antinode because of symmetry of the brake drum with respect to the center axis of rotation. However, if axes shown by dot-dash lines in FIGS. 1A to 1E are assumed along the diameter, it may be considered that these axes rotate around the brake drum. In this event, it can be deduced from an aspect of vibration that two eigenmodes, i.e., the eigenmode shown in FIGS. 1A to 1E and the eigenmode having the same profile shifted by a half period exist on the brake drum. Such cases may be considered as "multiple roots are included".

On the contrary, if the peripheral surface of the brake drum is vibrated in its rotating state as in a case where the actual drum brake is applied, a response mode in which the excitation point serves as an antinode may be observed as if it stands still in a space irrespective of the brake drum (such response mode is called as a "spatially fixed mode"). Since such spatially fixed mode means that the antinode of the eigenmode always serves as the excitation point, the mode can be excited with highest efficiency to maximize sound radiant efficiency. For this reason, such spatially fixed modes may often constitute a major factor for actual brake noises.

Such a phenomenon is not limited to the drum brake, but is true similarly of the disk brake wherein a disk rotor serving as the rotating cooling wheel rotated together with the wheel is held by brake pads since the disk rotator is formed of the circular disk having symmetry with respect to the center axis of rotation.

As the prior art pointing out such phenomenon, there has been disclosed Patent Application Publication (KOKAI) 56-52633 (first prior art) which has also been proposed previously by the inventors of the present invention. In other words, such first prior art is characterized in that at least three thick portions are formed on the outer peripheral surface of the brake drum at a constant distance in the circumferential direction. For instance, in the case that three thick portions are formed, these thick portions are located at antinodes of one of two eigenmodes in the diametral three-node mode, as shown in FIG. 2A, and act as additional masses to thus decrease the resonance frequency, but these thick portions locate at nodes of the other of two eigenmodes, as shown in FIG. 2B, and act as rigidity reinforcing members to thus increase the resonance frequency. Then, multiple roots are separated so that the spatial fixed mode can be eliminated to reduce sound radiant efficiency. As a result, brake noises can be suppressed. The concept to separate multiple roots by adding the mass has been introduced in a literature, "Paper No.88-0622A in Transactions of the Japanese Society of Mechanical Engineers(Section C), Vol.55, No.512 (1984-4)".

On the contrary, as other prior art pointing out the above phenomenon, there has been disclosed Utility Model Application Publication (KOKAI) 62-89537 (second prior art). In other words, the second prior art concerning the drum brake is characterized in that elastic members are intervened between the bottom of the brake drum and the wheel disk, the road wheel being constituted by the wheel disk as well as rims, at an equal distance on a concentric circle and that the elastic members are clamped by pressing the wheel disk to the brake drum. For instance, in the case that six elastic members are intervened, these elastic members locate at antinodes of one of two eigenmodes in the diametral three-node mode, as shown in FIG. 4A, and act as elastic members against vibration of the brake drum to thus increase the resonance frequency, but these elastic members locate at nodes of the other of two eigenmodes, as shown in FIG. 4B, and do not act as elastic members not to vary the resonance frequency. Then, multiple roots are separated so that the spatial fixed mode can be eliminated to reduce sound radiant efficiency, and consequently brake noises can be suppressed.

If three thick portions are provided at a constant distance, for example, in the structure in the first prior art, it is surely feasible to suppress brake noises in some degree since multiple roots included in the diametral three-node mode can be separated. However, since the order of the diametral node mode in which multiple roots are separable is determined in compliance with the number of the formed thick portions, sometimes unpleasant brake noises are still generated because of remaining diametral node modes in which multiple roots are not separable.

FIG. 3 is a graph illustrating the results derived from calculation according to the finite element method (FEM) every order of the diametral node mode to show differences in eigenvalues between the brake drum in which six thick portions are formed on the outer surface in accordance with the first prior art and the ordinary brake drum. As can be appreciated from the results, multiple roots can be separated by six additional masses in the mode of multiples of three such as diametral three-node mode or diametral six-node mode, but they cannot be separated as for other order even if natural frequency can be reduced.

Conversely, if the structure according to the above second prior art is adopted, the brake noises can be suppressed in some degree since multiple roots in the diametral three-node mode can be separated by interposing six elastic members between the brake drum and the wheel disk at a constant distance, for example. However, since the order of the diametral node mode in which multiple roots are separable is determined in compliance with the number of the intervened elastic members, unpleasant brake noises may still be generated because of remaining diametral node modes in which multiple roots are not separable.

FIG. 5 is a graph illustrating the results derived from calculation according to the finite element method (FEM) to show how eigenvalues of the diametral node mode can be separated in the drum brake in which six elastic members are intervened between the brake drum and the wheel disk in accordance with the second prior art. As apparent from the results, although multiple roots can be separated by six elastic members in the mode of multiple of three such as diametral three-node mode or diametral six-node mode, they cannot be separated as for other orders even if natural frequency can be reduced.

In other words, once the number of additional masses or elastic members is determined according to either the first prior art or second prior art, a separable order of multiple roots is decided. Although set forth in the above literature, relationships between the number N of the additional masses or elastic members and order i of the efficient diametral node mode are given, as shown in the following Table I. In Table I, a ○ mark represents a separable multiple root. According to Table I, in the case of two additional masses or elastic members, improvement can be obtained throughout all orders. In practice, not only can little effect be merely obtained in higher modes, but also the frequency cannot be tuned freely in higher modes if two additional masses or elastic members are employed.

TABLE I

| N | i=2 | 3 | 4 | 5 | 6 | 7 | 8 | 9 | 10 |
|---|---|---|---|---|---|---|---|---|---|
| 2 | ○ | ○ | ○ | ○ | ○ | ○ | ○ | ○ | ○ |
| 3 |   | ○ |   |   | ○ |   |   | ○ |   |
| 4 | ○ |   | ○ |   | ○ |   | ○ |   | ○ |
| 5 |   |   |   | ○ |   |   |   |   | ○ |
| 6 |   | ○ |   |   | ○ |   |   | ○ |   |
| 7 |   |   |   |   |   | ○ |   |   |   |
| 8 |   |   | ○ |   |   |   | ○ |   |   |

In the actual drum brake, because of differences in operating conditions such as operating hydraulic pressure for the wheel cylinder and lining changes with elapsed time, the frequency component of friction vibration caused between the inner peripheral surface of the brake drum and the linings is varied. Therefore, reduction in the vibration as with particular order of the diametral node mode, like the prior arts set forth in the above official gazettes and the literature, cannot successfully cope with sufficient reduction in the brake noises in any circumstances.

SUMMARY OF THE INVENTION

The present invention has been made to confront the above unsolved problems contained in the prior art, and it is an object of the present invention to provide a rotating cooling wheel for a brake capable of separating multiple root simultaneously in plural diametral node modes to thus reduce brake noise considerably rather than the prior art wheel, a method of manufacturing the same, and a drum brake employing such rotating cooling wheel.

In order to achieve the above object, according to an aspect of the present invention, there is provided a rotating cooling wheel for a brake which is rotated together with a wheel and forced to contact with a friction material supported on the car body side when said brake is operated, comprising: a plurality of mass/rigidity varying portions formed in at least four locations separated in the circumferential direction, each mass/rigidity varying portion having at least one of mass and rigidity which is increased or decreased; wherein a resultant center of gravity of at least four of said mass/rigidity varying portions is positioned on a center axis of rotation, and at least two of said mass/rigidity varying portions which are adjacent in the circumferential direction are formed to have different mass or rigidity.

According to another aspect of the present invention, there is provided a rotating cooling wheel for a brake which is rotated together with a wheel and forced to contact with a friction material supported on the car body side when said brake is operated, comprising: a plurality of mass/rigidity varying portions formed in at least four locations separated in the circumferential direction, each mass/rigidity varying portion having at least one of mass and rigidity which is increased or decreased; wherein at least four of said mass/rigidity varying portions may be divided into a plurality of groups which are made up of at least two mass/rigidity varying portions having identical mass or rigidity, and said mass/rigidity varying portions in respective groups are arranged at an equal distance in the circumferential direction.

According to still another aspect of the present invention, there is provided a rotating cooling wheel for a brake which is rotated together with a wheel and forced to contact with a friction material supported on the car body side when said brake is operated, comprising: a plurality of mass/rigidity varying portions formed in at least N (where N is a non-prime number more than four) locations separated in the circumferential direction, each mass/rigidity varying portion having at least one of mass and rigidity which is increased or decreased; wherein N mass/rigidity varying portions may be divided into M groups which are made up of N/M (where M is a natural number other than N, by which said non-prime number N is divisible) mass/rigidity varying portions having identical mass or rigidity, and said mass/rigidity varying portions in respective groups are arranged at an equal distance in the circumferential direction.

According to yet still another aspect of the present invention, there is provided a rotating cooling wheel for a brake which is rotated together with a wheel and forced to contact with a friction material supported on the car body side when said brake is operated, comprising: a plurality of mass/rigidity varying portions formed in N (where N is an even number more than four) locations separated at an equal distance in the circumferential direction, each mass/rigidity varying portion having at least one of mass and rigidity which is increased or decreased; wherein two of said mass/rigidity varying portions are opposed to each other so as to put a center axis of rotation therebetween and are formed to have identical mass or rigidity, and at least two of said mass/rigidity varying portions which are adjacent in the circumferential direction are formed to have different mass or rigidity.

In the preferred embodiment, N/2 kinds of a pair of said mass/rigidity varying portions having different mass or rigidity are provided.

In the preferred embodiment, said rotating cooling wheel is a brake drum for a drum brake, and said mass/rigidity varying portions are formed as thick portions or thin portions formed on an outer surface of said brake drum.

In the preferred embodiments, said rotating cooling wheel is a ventilated rotor of disk rotors used for a disk brake, in which a plurality of ventilating holes are formed to pass through between an inner surface and an outer surface, and said mass/rigidity varying portions are formed as thick portions or thin portions formed on an inner surface of said ventilating holes.

According to further aspect of the present invention, there is provided a method of manufacturing a rotating cooling wheel for a brake which is rotated together with a wheel and forced to contact with a friction material supported on the car body side when said brake is operated, comprising the steps of: setting a non-prime number N more than four and a natural number M other than N by which said non-prime number N is divisible; setting M groups in N/M mass/rigidity varying portion forming locations separated at an equal distance in the circumferential direction; and forming in said mass/rigidity varying portion forming locations a plurality of mass/rigidity varying portions each having at least one of mass and rigidity which is increased or decreased so as to have identical mass or rigidity in said N/M mass/rigidity varying portion forming locations in respective groups.

According to still further aspect of the present invention, there is provided a method of manufacturing a rotating cooling wheel for a brake which is rotated together with a wheel and forced to contact with a friction material supported on the car body side when said brake is operated, comprising the steps of: setting mass/rigidity varying portion forming locations in N (where N is a non-prime number more than four) locations separated at an equal distance in the circumferential direction; and forming in N mass/rigidity varying portion forming locations a plurality of mass/rigidity varying portions formed each having at least one of mass and rigidity which is increased or decreased so as to have identical mass or rigidity in two of said mass/rigidity varying portions opposing to each other to put a center axis of rotation therebetween and to have different mass or rigidity in at least two of said mass/rigidity varying portions which are adjacent in the circumferential direction.

In the preferred embodiment of the present invention, N/2 kinds of a pair of said mass/rigidity varying portions having different mass or rigidity are provided.

According to yet still further aspect of the present invention, there is provided a drum brake having a brake drum rotated together with a wheel, comprising: elastic members intervened between an outer peripheral surface or an outer surface of a bottom of said brake drum and a load wheel of said wheel in at least four locations separated in the circumferential direction; wherein a resultant center of gravity of at least four of said elastic members is positioned on a center axis of rotation, and at least two of said elastic members which are adjacent in the circumferential direction are formed to have different rigidity.

According to additional aspect of the present invention, there is provided a drum brake having a brake drum rotating together with a wheel, comprising: elastic members intervened between an outer peripheral surface or an outer surface of a bottom of said brake drum and a road wheel of said wheel in at least four locations separated in the circumferential direction; wherein at least four of said elastic members may be divided into a plurality of groups which are made up of at least two elastic members having identical rigidity, and said elastic members in respective groups are arranged at an equal distance in the circumferential direction.

According to still additional aspect of the present invention, there is provided a drum brake having a brake drum rotated together with a wheel, comprising: elastic members intervened between an outer peripheral surface or an outer surface of a bottom of said brake drum and a road wheel of said wheel in at least N (where N is a non-prime number more than four) locations separated in the circumferential direction; wherein N elastic members may be divided into M groups which are made up of N/M (where M is a natural number other than N, by which said non-prime number N is divisible) elastic members having identical rigidity, and said elastic members in respective groups are arranged at an equal distance in the circumferential direction.

According to yet still additional aspect of the present invention, there is provided a drum brake having a brake drum rotated together with a wheel, comprising: elastic members intervened between an outer peripheral surface or an outer surface of a bottom of said brake drum and a load wheel of said wheel in at least N (where N is an even number more than four) locations separated at an equal distance in the circumferential direction; wherein two of said elastic members are opposed to each other so as to put a center axis of rotation therebetween and are formed to have identical rigidity, and at least two of said elastic members which are adjacent in the circumferential direction are formed to have different rigidity.

In the preferred embodiment, N/2 kinds of a pair of said elastic members having different rigidity are provided.

In the preferred embodiment, there is provided a drum brake further comprising: an annular member arranged coaxially with said brake drum so as to oppose said outer peripheral surface or said outer surface of said bottom, whereby said elastic members are intervened between said outer peripheral surface or said outer surface of said bottom of said brake drum and said annular member.

In the preferred embodiment, there is provided a drum brake still further comprising: a metal cylindrical member arranged coaxially with said brake drum so as to enclose said outer peripheral surface of said brake drum, whereby a plurality of pawl portions are formed on said metal cylindrical member integrally therewith to extend outwardly from an edge portion of said metal cylindrical member, and said pawl portions are bent to produce elastic force so that bent pawl portions abut to said outer peripheral surface of said brake drum or said road wheel to thus serve said elastic members.

In the aspect of the present invention, since a resultant center of gravity of at least four of said mass/rigidity varying portions is positioned at a center axis of rotation of said rotating cooling wheel, the rotational balance is not lost even if said rotating cooling wheel is rotated together with the wheel. Since at least four of said mass/rigidity varying portions do not have identical mass or rigidity and two of said mass/rigidity varying portions which are adjacent in the circumferential direction and are formed to have different mass or rigidity, multiple roots can be separated in not only one order but also multiple orders of the diametral node modes, and vibration of said rotating cooling wheel can be reduced to thus suppress the brake noises.

In the another aspect of the present invention, since respective mass/rigidity varying portions included in respective groups consisted of more than two mass/rigidity varying portions having equal mass or rigidity are arranged at equal distance in the circumferential direction, a resultant center of gravity of said mass/rigidity varying portions belonging to respective groups is positioned at a center axis of rotation of said rotating cooling wheel. Therefore, the rotational balance is not lost even if said rotating cooling wheel is rotated together with the wheel. In addition, since at least four of said mass/rigidity varying portions may be classified into a plurality of groups which are made up of at least two mass/rigidity varying portions having identical mass or rigidity, multiple roots can be separated in not only one order but also multiple orders of the diametral node modes, and vibration of said rotating cooling wheel can be reduced to thus suppress the brake noises.

In the still another aspect of the present invention, since N/M mass/rigidity varying portions included in respective groups and having equal mass or rigidity are arranged at equal distance in the circumferential direction, a resultant center of gravity of said mass/rigidity varying portions belonging to respective groups is positioned at a center axis of rotation of said rotating cooling wheel. Therefore, the rotational balance is not disturbed even if said rotating cooling wheel is rotated together with the wheel. Further, since at least four of said mass/rigidity varying portions may be classified into M groups having different mass or rigidity, multiple roots can be separated in not only one order but also multiple orders of the diametral node modes, and vibration of said rotating cooling wheel can be reduced to thus suppress the brake noises.

In the yet still another aspect of the present invention, since respective mass/rigidity varying portions are arranged at N (N is an even number more than four) locations separated by equal distances in the circumferential direction, arrangement locations of respective mass/rigidity varying portions are opposed to put the center axis of rotation of said rotating cooling wheel therebetween (i.e., respective two mass/rigidity varying portions are arranged on an arbitrary diameter symmetrically to each other with respect to the center) Since respective two mass/rigidity varying portions arranged symmetrically to each other with respect to the center axis of rotation (i.e., separated by 180 degree in the circumferential direction) have identical mass or rigidity, a resultant center of gravity of said mass/rigidity varying portions is positioned at the center axis of rotation of said rotating cooling wheel. Thus, the rotational balance is not lost even if said rotating cooling wheel is rotated together with the wheel. In addition, since these mass/rigidity varying portions do not have identical mass or rigidity and two of said mass/rigidity varying portions which are adjacent in the circumferential direction and are formed to have different mass or rigidity, multiple roots can be separated in not only one order but also multiple orders of the diametral node modes, and vibration of said rotating cooling wheel can be reduced to thus suppress the brake noises.

Especially, in the preferred embodiment, since N/2 kinds of a pair of said mass/rigidity varying portions having different mass or rigidity are provided, multiple roots can be separated firmly in multiple orders of the diametral node modes even if the number of said mass/rigidity varying portions is small.

In the preferred embodiment, the inventions set forth in the above aspects are applied to the brake drum in the drum brake. Since said mass/rigidity varying portions are formed as thick portions or thin portions formed on an outer surface of said brake drum, said mass/rigidity varying portions are formed easily. If the thick portions or the thin portions are formed on the outer surface, function as additional mass can be produced with highest efficiency. Therefore, functions set forth in the above aspects may produce firmly and radiation efficiency can be improved.

In the preferred embodiment, the inventions set forth in the above aspects are applied to the ventilated rotor which is one of disk rotors in the disk brake. Since said mass/rigidity varying portions are formed as thick portions or thin portions formed on an inner surface of said ventilated rotor, said mass/rigidity varying portions are formed easily. Since said mass/rigidity varying portions are formed in the ventilated rotor, there is no problem if the margin of space in which said ventilated rotor is arranged is small.

In the further aspect of the present invention, the rotating cooling wheel for the brake in the still another aspect of the present invention can be manufactured easily. Similarly, in the still further aspect of the present invention, the rotating cooling wheel for the brake in the yet still another aspect of the present invention can be manufactured easily. In the preferred embodiment, the rotating cooling wheel for the brake in the preferred embodiment of the present invention can be manufactured easily. In other words, in the above preferred embodiments, unless the center of gravity of the whole mass/rigidity varying portion, increase or decrease in mass or rigidity of respective mass/rigidity varying portion, etc. are not investigated in detail, the rotating cooling wheel for the brake can be manufactured in which multiple roots can be separated in not only one order but also multiple orders of the diametral node modes and vibration of said rotating cooling wheel can be reduced to thus suppress the brake noises.

In the yet still further aspect of the present invention, since a resultant center of gravity of at least four of said mass/rigidity varying portions is positioned at a center axis of rotation of said rotating cooling wheel, the rotational balance is not lost even if said rotating cooling wheel is rotated together with the wheel. Since at least four of said mass/rigidity varying portions do not have identical mass or rigidity and two of said mass/rigidity varying portions which are adjacent in the circumferential direction and are formed to have different mass or rigidity, multiple roots can be separated in not only one order but also multiple orders of the diametral node modes, and vibration of said rotating cooling wheel can be reduced to thus suppress the brake noises.

In the additional aspect of the present invention, since respective mass/rigidity varying portions included in respective groups consisting of more than two mass/rigidity varying portions having equal mass or rigidity are arranged at equal distance in the circumferential direction, a resultant center of gravity of said mass/rigidity varying portions belonging to respective groups is positioned at a center axis of rotation of said rotating cooling wheel. Therefore, the rotational balance is not lost even if said rotating cooling wheel is rotated together with the wheel. In addition, since at least four of said mass/rigidity varying portions may be classified into a plurality of groups which are made up of at least two mass/rigidity varying portions having identical mass or rigidity, multiple roots can be separated in not only one order but also multiple orders of the diametral node modes, and vibration of said rotating cooling wheel can be reduced to thus suppress the brake noises.

In the still additional aspect of the present invention, since N/M mass/rigidity varying portions included in respective groups and having equal mass or rigidity are arranged at equal distance in the circumferential direction, a resultant center of gravity of said mass/rigidity varying portions belonging to respective groups is positioned at a center axis of rotation of said rotating cooling wheel. Therefore, the rotational balance is not disturbed even if said rotating cooling wheel is rotated together with the wheel. Further, since at least four of said mass/rigidity varying portions may be classified into M groups having different mass or rigidity, multiple roots can be separated in not only one order but also multiple orders of the diametral node modes, and vibration of said rotating cooling wheel can be reduced to thus suppress the brake noises.

In the yet still additional aspect of the present invention, since respective mass/rigidity varying portions are arranged at N (N is an even number more than four) locations separated at equal distance in the circumferential direction, arrangement locations of respective mass/rigidity varying portions are opposed to put the center axis of rotation of said rotating cooling wheel therebetween (i.e., respective two mass/rigidity varying portions are arranged on an arbitrary diameter symmetrically to each other with respect to the center). Since respective two mass/rigidity varying portions arranged symmetrically to each other with respect to the center axis of rotation (i.e., separated by 180 degree in the circumferential direction) have identical mass or rigidity, a resultant center of gravity of said mass/rigidity varying portions is positioned at the center axis of rotation of said rotating cooling wheel. Thus, the rotational balance is not lost even if said rotating cooling wheel is rotated together with the wheel. In addition, since these mass/rigidity varying portions do not have identical mass or rigidity and two of said mass/rigidity varying portions which being adjacent in the circumferential direction are formed to have different mass or rigidity, multiple roots can be separated in not only one order but also multiple orders of the diametral node modes, and vibration of said rotating cooling wheel can be reduced to thus suppress the brake noises.

In the preferred embodiment, since N/2 kinds of a pair of said mass/rigidity varying portions having different mass or rigidity are provided, multiple roots can be separated firmly in multiple orders of the diametral node modes even if the number of said mass/rigidity varying portions is small.

In the preferred embodiment, it can be applied without working of the road wheel. etc. in addition to the functions set forth in the above aspects.

In the preferred embodiment, since the elastic members are formed of metal, a possibility becomes small that degradation of the elastic member due to frictional heat, etc. in addition to the functions set forth in the above aspects.

BRIEF DESCRIPTION OF THE DRAWINGS

FIGS. 2A and 2B are conceptual representations illustrative of separation of multiple root according to the first prior art;

FIG. 3 is a graph illustrating rate of change of eigenvalues in the first prior art;

DETAILED DESCRIPTION OF THE PREFERRED EMBODIMENTS

Preferred embodiments of the present invention will be explained in detail with reference to accompanying drawings hereinbelow.

First Embodiment

Figure 1A:
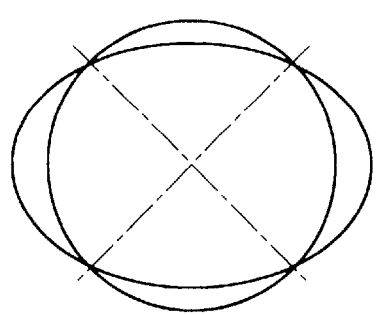
FIGS. 1A to 1E are conceptional representations illustrative of eigenmodes of a brake drum.
Figure 1B:
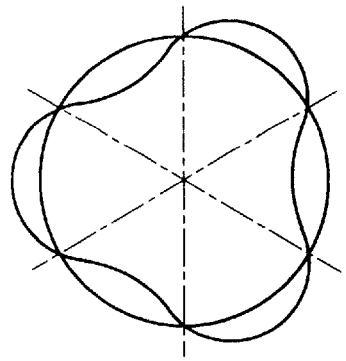
Figure 1C:
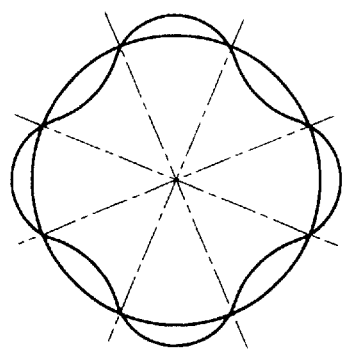
Figure 1D:
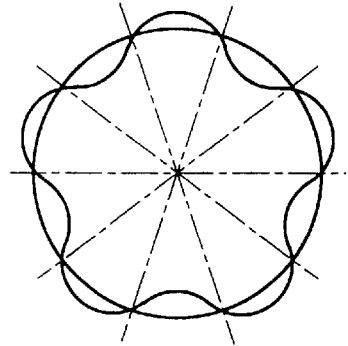
Figure 1E:
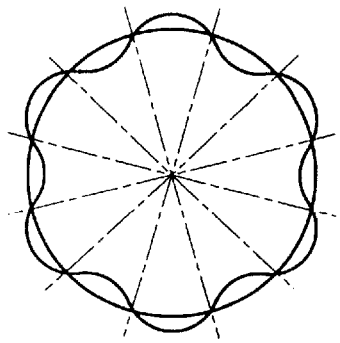
Figure 4A:
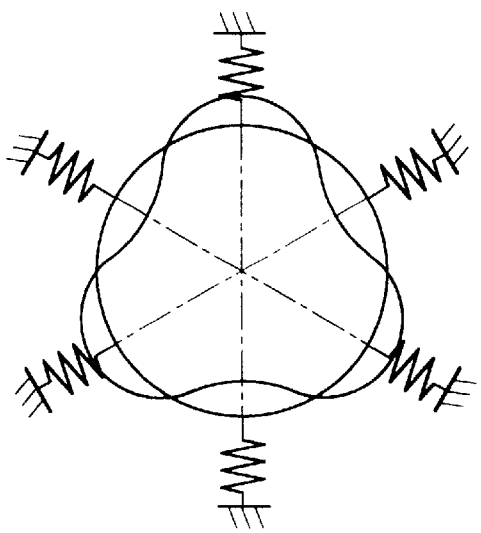
FIGS. 4A and 4B are conceptional representations illustrative of separation of multiple root according to the second prior art.
Figure 4B:
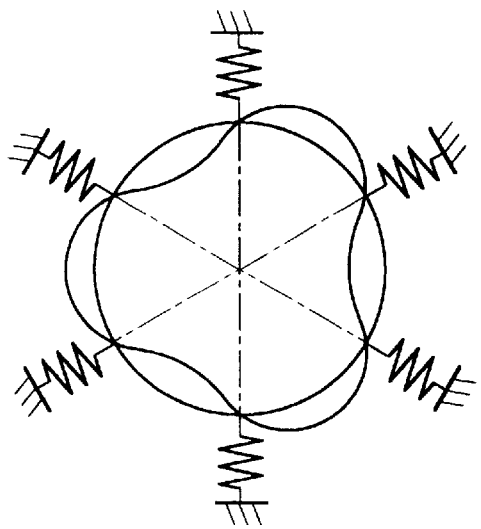
Figure 5:
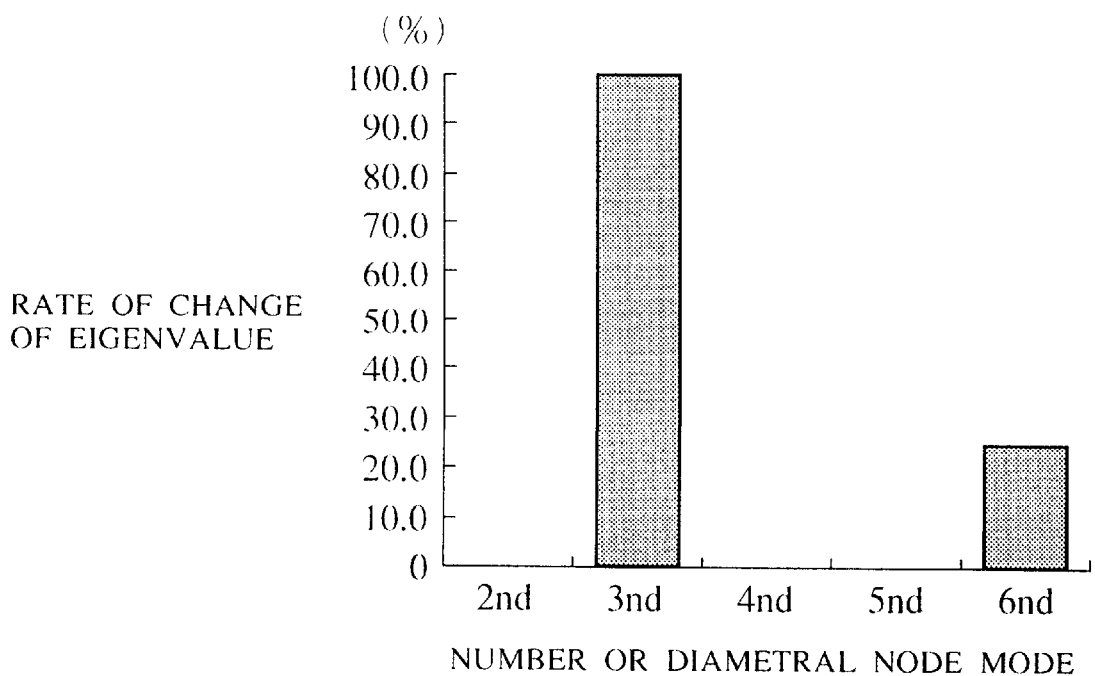
FIG. 5 is a graph illustrating rate of change of eigenvalues in the second prior art.
Figure 6:
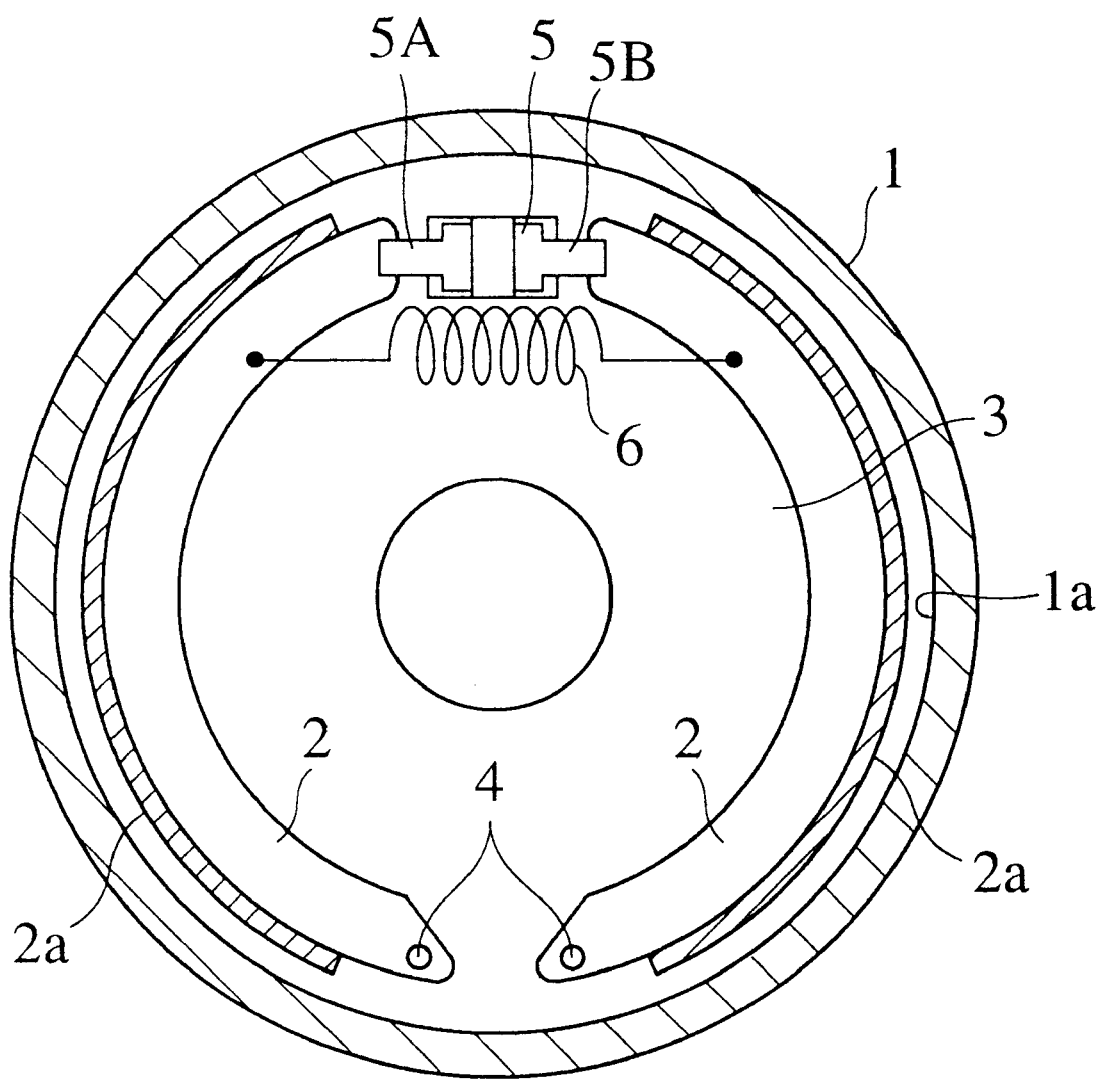
FIG. 6 is a sectional view showing a structure of a drum brake according to a first embodiment of the present invention.

FIG. 6 is a sectional view showing a structure of a drum brake according to the first embodiment. The drum brake is operated with the use of friction force caused when linings 2a which are stuck on substantially circular brake shoes 2 supported to a member and the like on the car body side are forced to contact an inner peripheral surface of a substantially cylindrical brake drum 1 which acts as a rotating cooling wheel rotated together with a wheel.

In particular, in the drum brake, anchors 4 are secured to a back plate 3 fixed on the car body side to be positioned in the inside of the inner peripheral surface 1a of the brake drum 1 and receive braking torque. One opposing ends of a pair of brake shoes 2 are fitted swingably to the anchors 4. Each piece of a pair of brake shoes 2 is arranged along the inner peripheral surface 1a of the brake drum 1. When the brake is not operated, the linings 2a stuck on outer surfaces of the brake shoes 2 are opposed to the inner peripheral surface 1a at a predetermined distance.

A wheel cylinder 5 and a return spring 6 are provided to the other ends of a pair of brake shoes 2 which are opposed to each other on the side opposite to the anchors 4 side. When hydraulic pressure is supplied to the wheel cylinder 5, a pair of pistons 5A, 5B which are provided to move back and forth in the lateral direction are displaced to extend. Accordingly, the other ends of a pair of brake shoes 2 are opened laterally to be pushed to the inner peripheral surface 1a, so that the linings 2a are pushed to contact to the inner peripheral surface 1a. A rotating force of the brake drum 1 is converted into frictional heat in their contacting areas to thus operate the brake.

Figure 7:
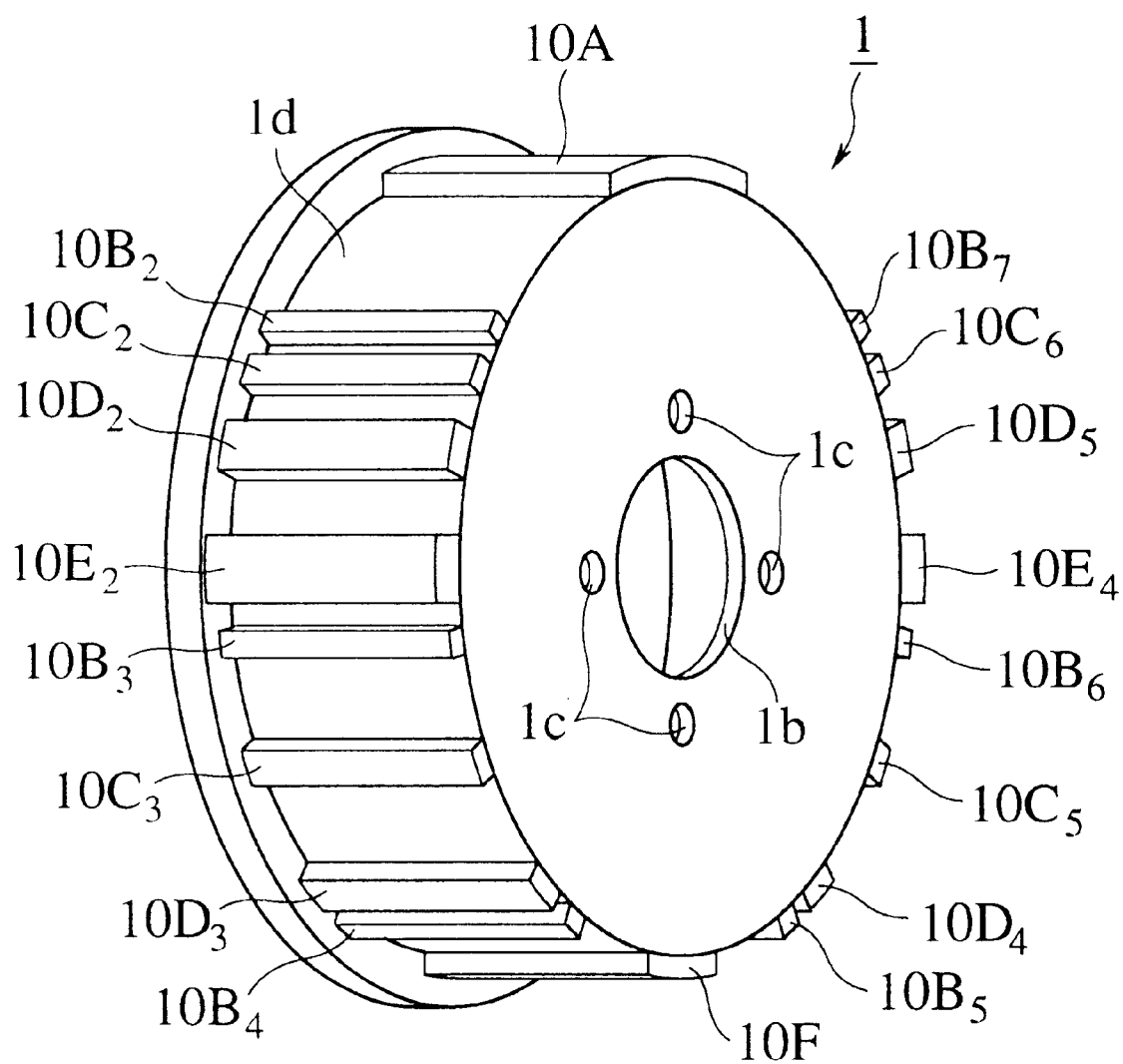
FIG. 7 is a perspective view showing a brake drum according to a first embodiment of the present invention.
Figure 8:
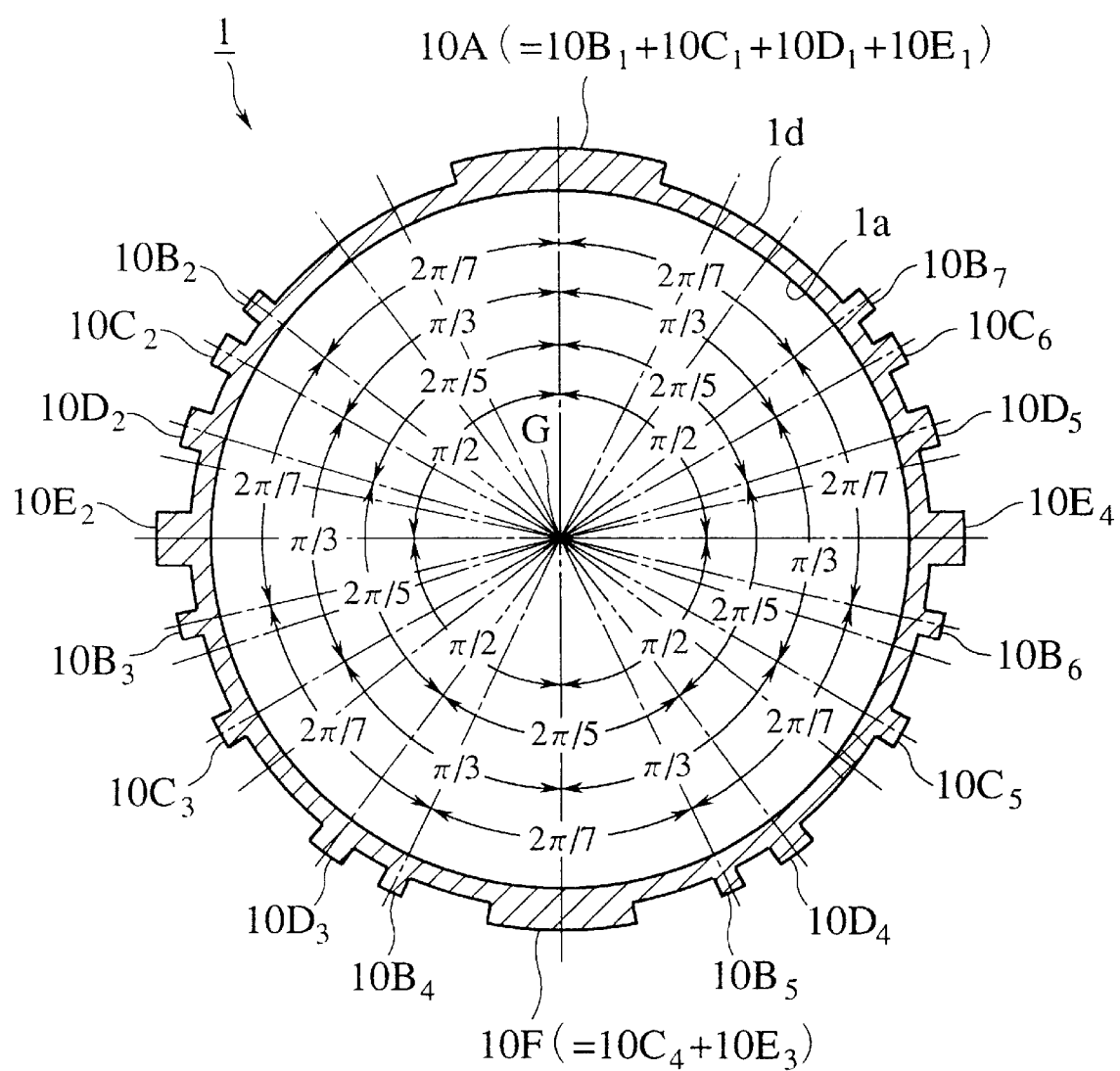
FIG. 8 is a sectional view showing an axially central portion of the brake drum according to the first embodiment in FIG. 7.

FIGS. 7 and 8 are views showing a brake drum according to a first embodiment of the present invention. In the first embodiment, the present invention is applied to the brake drum 1 serving as a rotating cooling wheel for use in the drum brake.

More particularly, the brake drum 1 in the first embodiment is formed to have a substantially cylindrical shape, as shown in a perspective view of FIG. 7. One end portion of the brake drum 1 is closed except for a central through hole 1b and a plurality of bolt holes 1c which are used to be fitted into the wheel side. The other end portion of the brake drum 1 is open, and in the inside of the cylindrical shape the brake shoes 2 and the wheel cylinder 5 shown in FIG. 6 are arranged and the back plate 3 supported to the car body side is arranged.

On an outer peripheral surface 1d of the brake drum 1 are formed a plurality of thick portions 10A, 10B$_2$, ..., 10F which act as mass/rigidity varying portions and each of which is long in shape in the direction along a center axis of rotation (an axis passing through a center of the cylindrical shape) of the brake drum 1 and short in the circumferential direction. The thick portions 10A, 10B$_2$, ..., 10F are integrated with the cylindrical shape portion of the brake drum 1. Like the conventional brake drum, the overall brake drum 1 including the thick portions 10A, 10B$_2$, ..., 10F can be formed by casting with the use of a mold.

Assume that, among these thick portions 10A, 10B$_2$, ..., 10F, six thick portions 10B$_2$, 10B$_3$, 10B$_4$, 10B5, and 10B$_6$ have the same shape and each has a mass of $M_{1B}$; four thick portions 10C$_2$, 10C$_3$, 10C$_5$, and 10C$_6$ have the same shape and each has a mass of $M_{1C}$; four thick portions 10D$_2$, 10D$_3$, 10D$_4$, and 10D$_5$ have the same shape and each has a mass of $M_{1D}$; and two thick portions 10E$_2$, and 10E$_4$ have the same shape and each has a mass of $M_{1E}$. Then, if it is assumed that a mass of the thick portion 10A is $M_{1A}$ and a mass of the thick portion 10F is $M_{1F}$, following expressions can be derived among these masses $M_{1A}$ to $M_{1F}$.

$$M_{1A} > M_{1F} > M_{1E} > M_{1D} > M_{1C} > M_{1B} > 0 \quad (1)$$

$$M_{1A} = M_{1B} + M_{1C} + M_{1D} + M_{1E} \quad (2)$$

$$M_{1F} = M_{1C} + M_{1E} \quad (3)$$

Arrangement locations of these thick portions 10A, 10B$_2$, ..., 10F (where an arrangement location means a center-of-gravity location of each thick portion) are allocated as shown in FIG. 8 which is a sectional view showing an axially central portion of the brake drum 1. In other words, these thick portions are allocated in such a manner that the thick portions 10A and 10F are separated by 180 degrees in the circumferential direction. The center-of-gravity location of the thick portion 10A is used as a reference location. The thick portion 10B$_2$ is arranged at a location shifted counterclockwise in the circumferential direction in FIG. 8 from the reference location by $2\pi/7$ (radian: radian is used as an angular unit hereinafter unless particularly mentioned). The thick portion 10B$_3$ is arranged at a location shifted similarly from the arrangement location of the thick portion 10B$_2$ by $2\pi/7$, and so on. Therefore, seven thick portions, i.e., thick portions 10A and thick portions 10B$_2$ to B$_7$, are arranged at an equal distance in the circumferential direction.

Similarly, the arrangement location of the thick portion 10A is used as a reference location. The thick portion 10C$_2$ is arranged at a location shifted from the reference location by π/3 counterclockwise in the circumferential direction in FIG. 8. The thick portion $10C_3$ is arranged at a location shifted similarly by π/3 from the thick portion $10C_2$. The thick portion 10F is arranged at a location shifted similarly by π/3 from the thick portion $10C_3$. The thick portion $10C_5$ is arranged at a location shifted similarly by π/3 from the thick portion 10F, and so forth. Accordingly, six thick portions, i.e., thick portions 10A, thick portions $10C_2$ to $C_6$, and thick portion 10F are arranged at an equal distance in the circumferential direction.

Then, the arrangement location of the thick portion 10A is similarly used as a reference location. The thick portion $10D_2$ is arranged at a location shifted from the reference location by 2π/5 counterclockwise in the circumferential direction in FIG. 8. The thick portion $10D_3$ is arranged at a location shifted similarly by 2π/5 from the thick portion $10D_2$, and so on. Therefore, five thick portions, i.e., thick portions 10A and thick portions $10D_2$ to $D_5$, are arranged at an equal distance in the circumferential direction.

In addition, the thick portions $10E_2$ and $10E_4$ are arranged at locations shifted similarly by π/2 in the circumferential direction from the thick portions 10A and 10F, respectively. Accordingly, four thick portions, i.e., thick portion 10A, thick portions $10E_2$ and $10E_4$, and thick portion 10F, are arranged at an equal distance in the circumferential direction.

In this case, since as given in the equation (2) the mass $M_{1A}$ of the thick portion 10A is equal to a total sum of masses $M_{1B}$ to $M_{1E}$, this thick portion 10A may be regarded as a thick portion in which the thick portion $10B_1$ with mass $M_{1B}$, the thick portion $10C_1$ with mass $M_{1C}$, the thick portion $10D_1$ with mass $M_{1D}$, and the thick portion $10E_1$ with mass $M_{1E}$ are unified together.

In a similar fashion, since as given in the equation (3) the mass $M_{1F}$ of the thick portion 10F is equal to a total sum of masses $M_{1C}$ and $M_{1E}$, this thick portion 10F may be regarded as a thick portion in which the thick portion $10C_4$ with mass $M_{1C}$, and the thick portion $10E_3$ with mass $M_{1E}$ are unified together.

With the above discussion, on an outer surface 1d of the brake drum 1 are formed seven thick portions $10B_1$ to $10B_7$ each having mass $M_{1B}$ and separated at an equal distance in the circumferential direction from a reference line which is formed of an arbitrary diameter, six thick portions $10C_1$ to $10C_6$ each having mass $M_{1C}$ and separated at an equal distance in the circumferential direction from the same reference line, five thick portions $10D_1$ to $10D_5$ each having mass $M_{1D}$ and separated at an equal distance in the circumferential direction from the same reference line, and four thick portions $10E_1$ to $10E_4$ each having mass $M_{1E}$ and separated at an equal distance in the circumferential direction from the same reference line.

In summary, on the outer surface 1d of the brake drum 1 are formed total sum 22 thick portions which can be classified into four groups ($10B_1$ to $10B_7$, $10C_1$ to $10C_6$, $10D_1$ to $10D_5$, and $10E_1$ to $10E_4$), each group having identical masses. Thick portions in respective groups are arranged at an equal distance in the circumferential direction.

The above structure is nothing less than that the thick portions with equal mass are arranged at an equal distance in the circumferential direction even though many thick portions 10A, $10B_2$, . . . , 10F are formed on the outer surface 1d of the brake drum 1. Therefore, a resultant center of gravity G of the thick portions 10A, $10B_2$, . . . , 10F is situated at a center axis of rotation (an axis extending in the direction perpendicular to a face of the drawing sheet to pass through the center of the brake drum 1 in FIG. 8) of the brake drum 1. Hence, if the brake drum 1 is rotated together with the wheel at high speed, rotational balance is not lost.

Since seven thick portions $10B_1$ to $10B_7$ act as additional masses when the brake drum 1 is rotated, multiple roots can be separated effectively in the diametral seven-node mode based on above Table I. At the same time, since six thick portions $10C_1$ to $10C_6$ act as additional masses, multiple roots can be separated effectively in the diametral three-, six- and nine-node modes based on above Table I. Simultaneously, since five thick portions $10D_1$ to $10D_5$ act as additional masses, multiple roots can be separated effectively in the diametral five- and ten-node modes based on above Table I. Similarly, since four thick portions $10E_1$ to $10E_4$ act as additional masses, multiple roots can be separated effectively in the diametral two-, four-, eight- and ten-node modes based on above Table I.

Accordingly, since multiple roots can be separated against not only one order but also multiple orders of the mode based on action of respective thick portions 10A, $10B_2$, . . . , 10F as additional mass, multiple roots seldom appear even if frequency components of friction vibration caused between the inner surface 1a of the brake drum 1 and the linings 2a are varied due to operational conditions such as hydraulic pressure in the wheel cylinder, change with elapsed time of the linings as frictional members on the surfaces of the brake shoes 2, etc. Therefore, even if bending vibration is excited by contacting the inner surface 1a of the brake drum 1 with the linings 2a when the brake is applied, a possibility becomes extremely small that the spatially fixed mode is caused to thus reduce sound radiant efficiency. As a result, the brake noises can be suppressed and a noise level can be decreased.

In the first embodiment, although the thick portions 10A to 10F have been formed as mass/rigidity varying portions on the outer peripheral surface 1d of the brake drum 1, these thick portions 10A to 10F may be fabricated at the same time when the main body of the brake drum 1 is cast. In other words, since the brake drum 1 of the first embodiment may be manufactured by making use of the only slightly modified mold, manufacturing cost is not increased extremely compared to the conventional brake drum.

Further, if the thick portions 10A to 10F are formed on the outer peripheral surface 1d of the brake drum 1, these thick portions 10A to 10F may serve effectively as additional mass for bending vibration modes of the brake drum 1, as shown in FIGS. 1A to 1E. This means that the same advantage can be obtained by the minimum of thick portions. For this reason, increase in weight of the brake drum 1 due to formation of the thick portions can be kept at a minimum, so that increase in unsprung mass (non-suspended mass) can be reduced.

Second Embodiment

FIGS. 9 to 12 are views showing a ventilated rotor according to a second embodiment of the present invention. In the second embodiment, the present invention is applied to the ventilated rotor 11 serving as a rotating cooling wheel for use in the disk brake.

Figure 9:
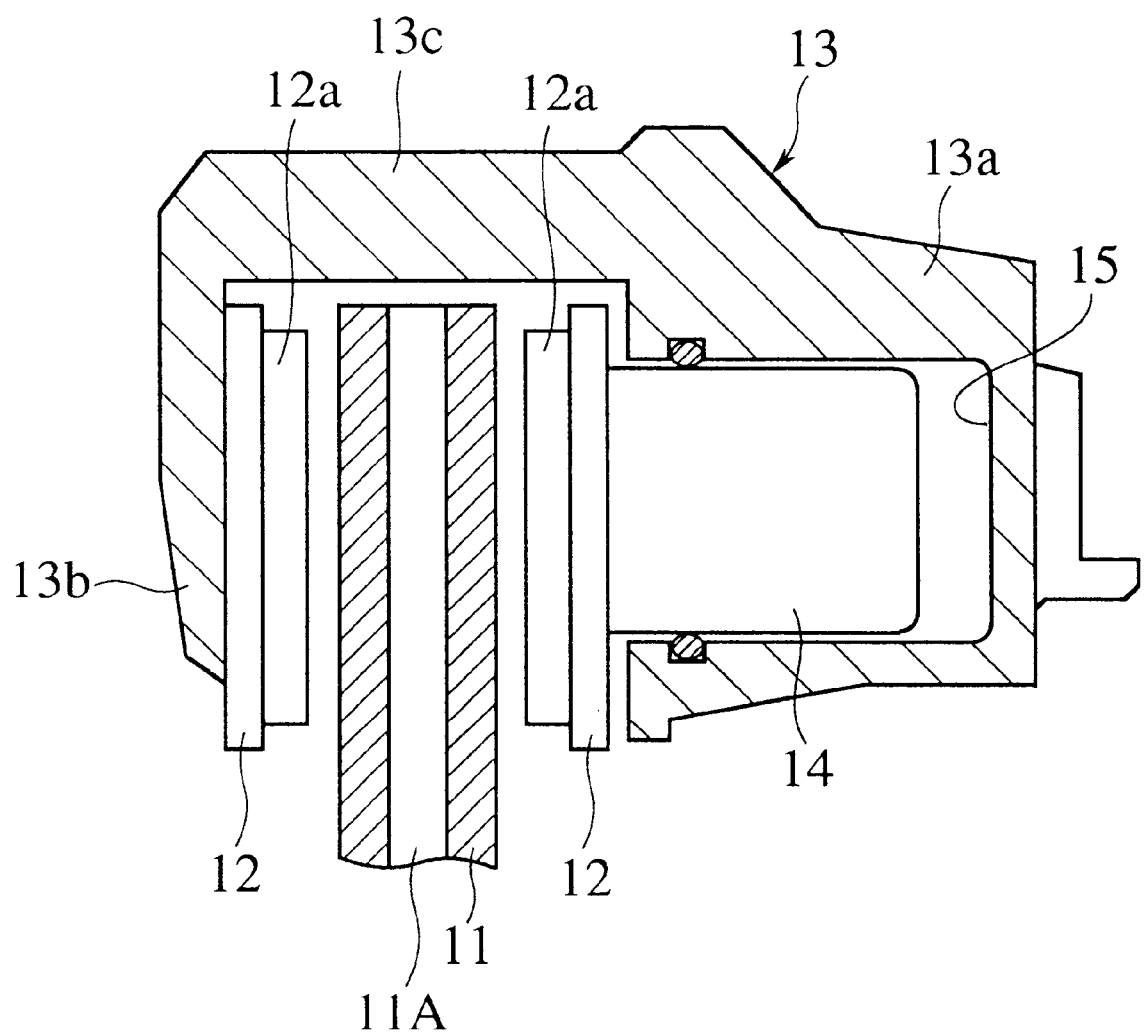
FIG. 9 is a sectional view showing a structure of a disk brake.

In the disk brake a schematic structure of which is shown in section in FIG. 9, the ventilated rotor 11 serving as a disk rotor rotated together with the wheel is clamped by a pair of brake pads 12, and the brake is applied by virtue of friction force caused between the contacting portions of the linings 12a as friction members of the brake pads 12 and the ventilated rotor 11. More particularly, a pair of brake pads 12 are provided to a torque member (not shown) fixed to the car body side so as to put the ventilated rotor 11 therebetween from both sides. The brake pads 12 are supported to the torque member so as to move back and forth in the axial direction (lateral direction in FIG. 9) of the ventilated rotor 11. A cylinder body 13 is secured to the torque member so as to move back and forth in the axial direction via a slide pin, etc. (not shown). The cylinder body 13 is made up of a base portion 13a formed to oppose to a back surface of one of the brake pads 12, a pawl portion 13b formed to oppose to a back surface of the other of the brake pads 12, and a connecting portion 13c for connecting the pawl portion 13b to the base portion 13a. A cylinder hole 15 is formed in the base portion 13a of the cylinder body 13. In the cylinder hole 15 is held a piston 14 which can push the back surface of one of the brake pads 12 toward the ventilated rotor 11. The piston 14 is formed to move back and forth by virtue of hydraulic pressure supplied from a master cylinder (not shown) to the cylinder hole 15.

Accordingly, when hydraulic pressure is supplied to the cylinder hole 15 at the time of braking, the piston 14 is forced to move to the ventilated rotor 11 side. Then, one of the brake pads 12 is pushed by the piston 14 to move to the ventilated rotor 11 side, and then the lining 12a on the brake pad 12 contacts with one surface of the ventilated rotor 11. Subsequently, when the piston 14 is still forced to move to the ventilated rotor 11 side, the cylinder body 13 is moved in the direction opposite to the moving direction of the piston 14 due to a reaction force against pushing force to the brake pad 12. Therefore, the pawl portion 13b moves to the ventilated rotor 11 side and the other of the brake pads 12 is forced to move to the ventilated rotor 11 side because it is pushed by the pawl portion 13b, and therefore the lining 12a of the brake pad 12 contacts with the other surface of the ventilated rotor 11. Since the above operation is effected instantaneously, i.e., within a very short time, the ventilated rotor 11 is clamped by a pair of the brake pads 12 from both sides substantially simultaneously with a driver's depressing the brake pedal to apply the brake.

Figure 10:
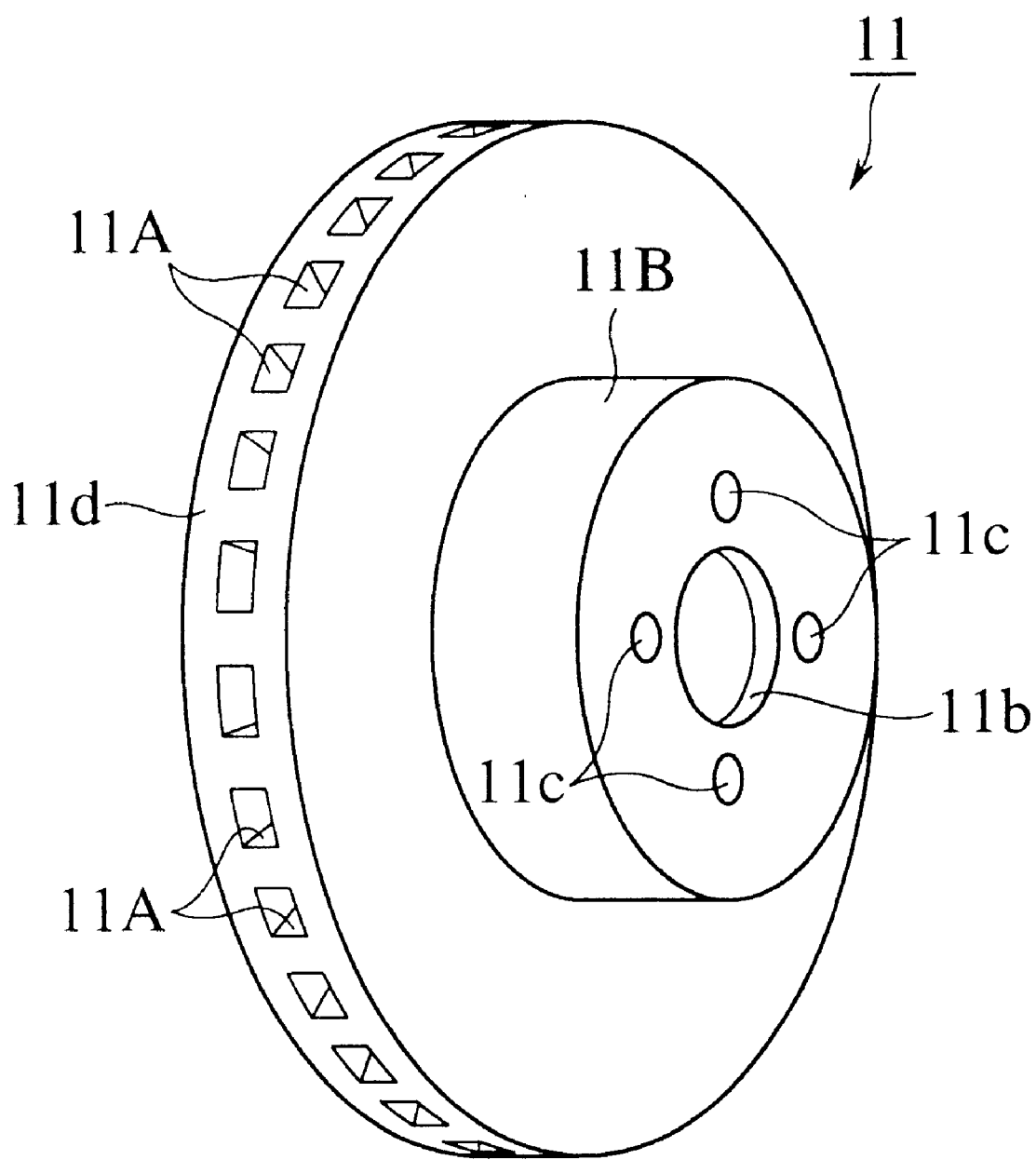
FIG. 10 is a perspective view showing a ventilated rotor according to a second embodiment of the present invention, used in the disk brake in FIG. 9.

As shown in perspective in FIG. 10, a plurality of ventilating holes 11A are formed in the ventilated rotor 11 to extend in a radial fashion and to pass through from the inner peripheral surface 11a (not shown in FIG. 10) to the outer peripheral surface 11d. In addition, a central through hole 11b and a plurality of bolt holes 11c which are used to fit into the wheel side are formed on an end surface of a cylindrical hollow portion 11B which is projected continuously from the inner peripheral surface 11a of the ventilated rotor 11 to the one surface side coaxially.

Figure 11:
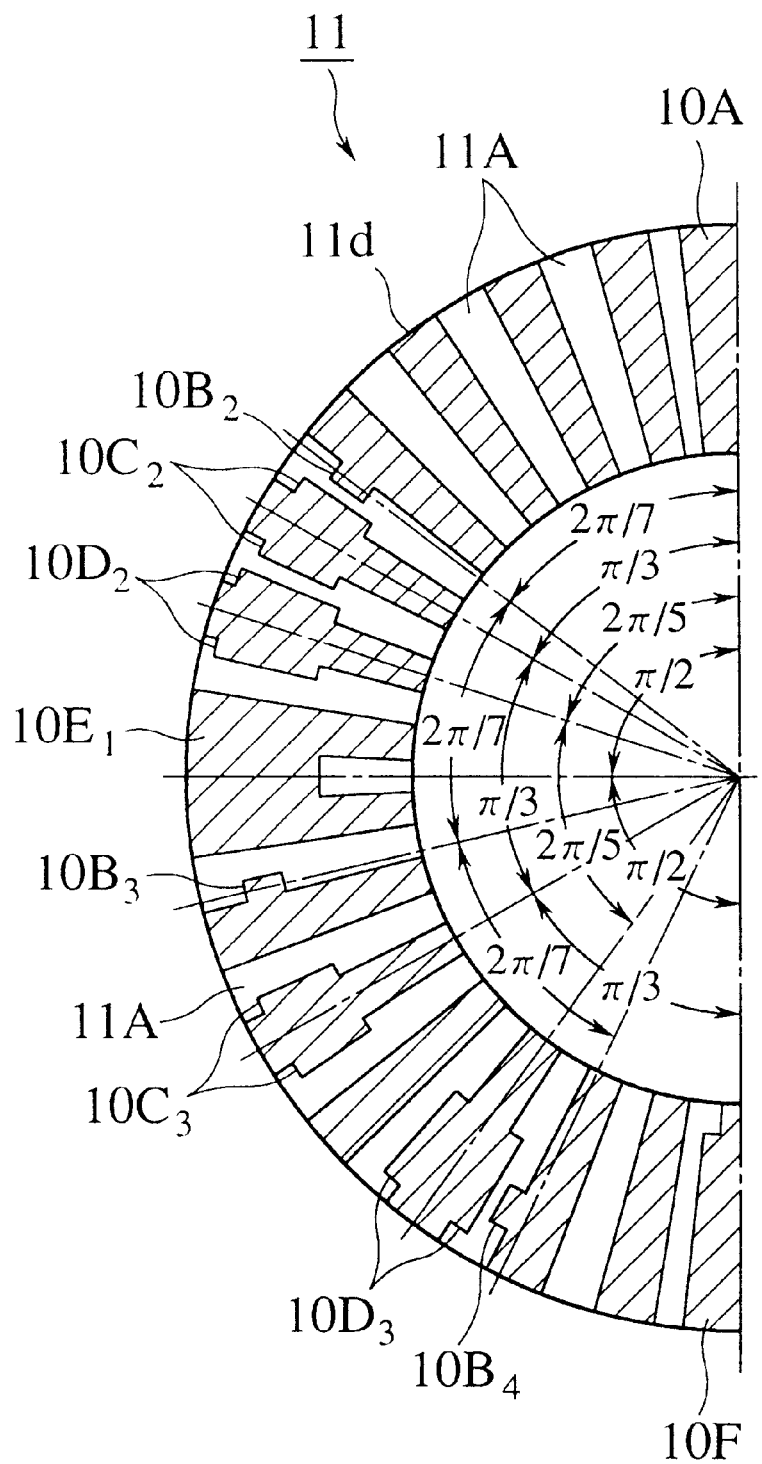
FIG. 11 is a sectional view showing an axially central portion of the ventilated rotor according to the second embodiment in FIG. 10.
Figure 12:
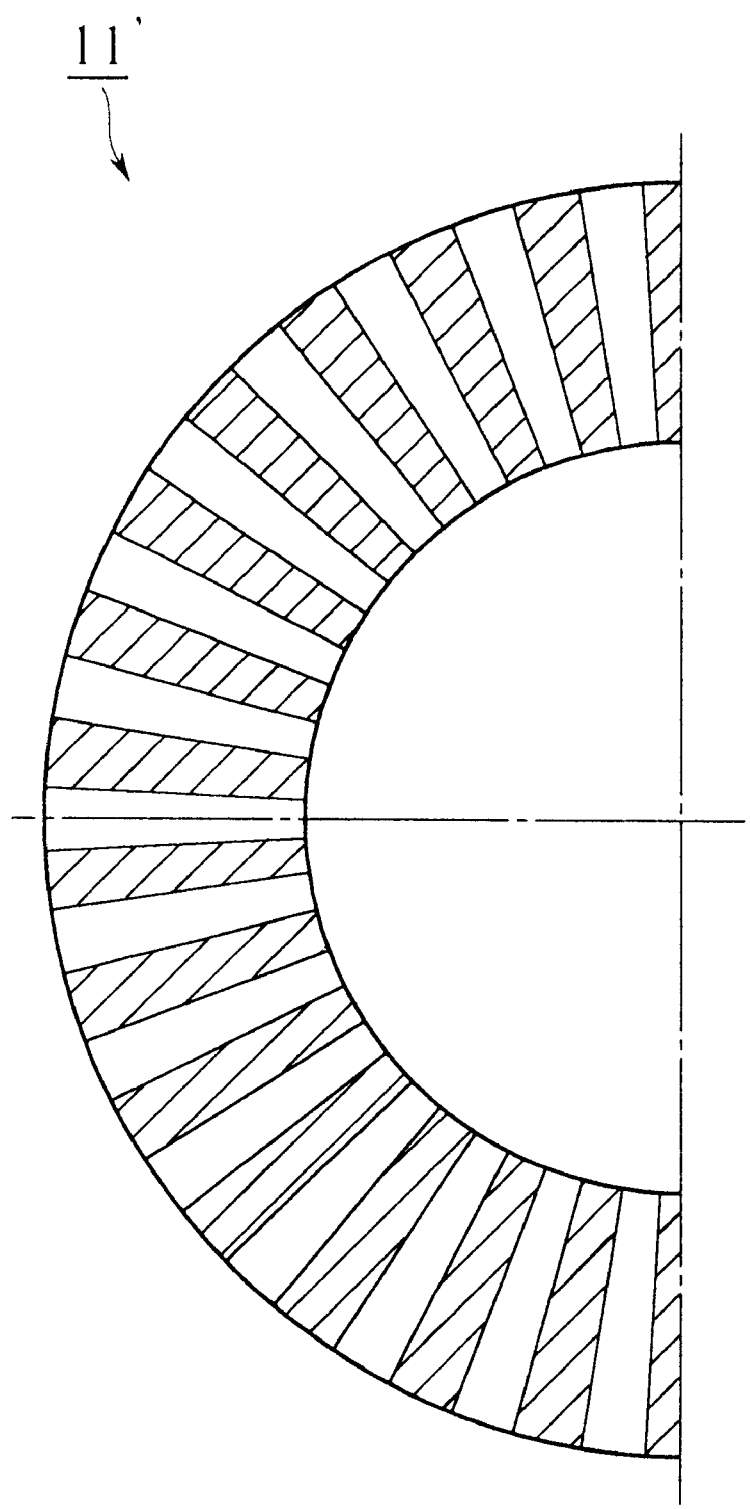
FIG. 12 is a sectional view showing an axially central portion of the conventional ventilated rotor.

As shown in FIG. 11 being a sectional view showing the left half of the axially central portion of the ventilated rotor 11 in the second embodiment, the thick portions 10A, 10B$_2$, ..., 10F are formed on the inner surfaces of the ventilating holes 11A of the ventilated rotor 11. The right half not shown in FIG. 11 is omitted since it is symmetrical to the structure of the left half in FIG. 11 FIG. 12 is a sectional view showing the left half of the axially central portion of the ordinary ventilated rotor 11' in which no thick portion are formed. As can be further appreciated by comparing FIG. 11 with FIG. 12, respective thick portions 10A, 10B$_2$, ..., 10F are formed by appropriately increasing a thickness of side surfaces of the ventilating holes 11A appropriately.

The masses and arrangement locations of respective thick portions 10A, 10B$_2$, ..., 10F are identical to the first embodiment including the right half not shown. In other words, the thick portions 10A, 10B$_2$, ..., 10F in the first embodiment coincide with the thick portions 10A, 10B$_2$, ..., 10F in the second embodiment in respects of mass and arrangement location of the thick portions represented by the like symbols.

With the above structure, like the first embodiment, respective thick portions 10A, 10B$_2$, ..., 10F may also act as additional masses in the disk brake. Therefore, even if bending vibration is excited by contacting the ventilated rotor 11 with the linings 12a when the brake is applied, there is an extremely small possibility that the spatially fixed mode is caused to thus reduce sound radiant efficiency. Consequently, the brake noises can be suppressed and a noise level can also be decreased.

In the second embodiment, the thick portions 10A to 10F have been formed as mass/rigidity varying portions on the inner surfaces of the ventilating holes 11A of the ventilated rotor 11. However, since these thick portions 10A to 10F may be manufactured simultaneously with casting of the ventilating holes 11A, manufacturing cost is not increased in contrast to the conventional ventilated rotor. Furthermore, since the thick portions as mass/rigidity varying portions are formed in the ventilated rotor 11 not to protrude to the outside, no trouble is caused if spatial margin is not sufficient for an arrangement space, and design change of neighboring portions is never needed.

Third Embodiment

Figure 13:
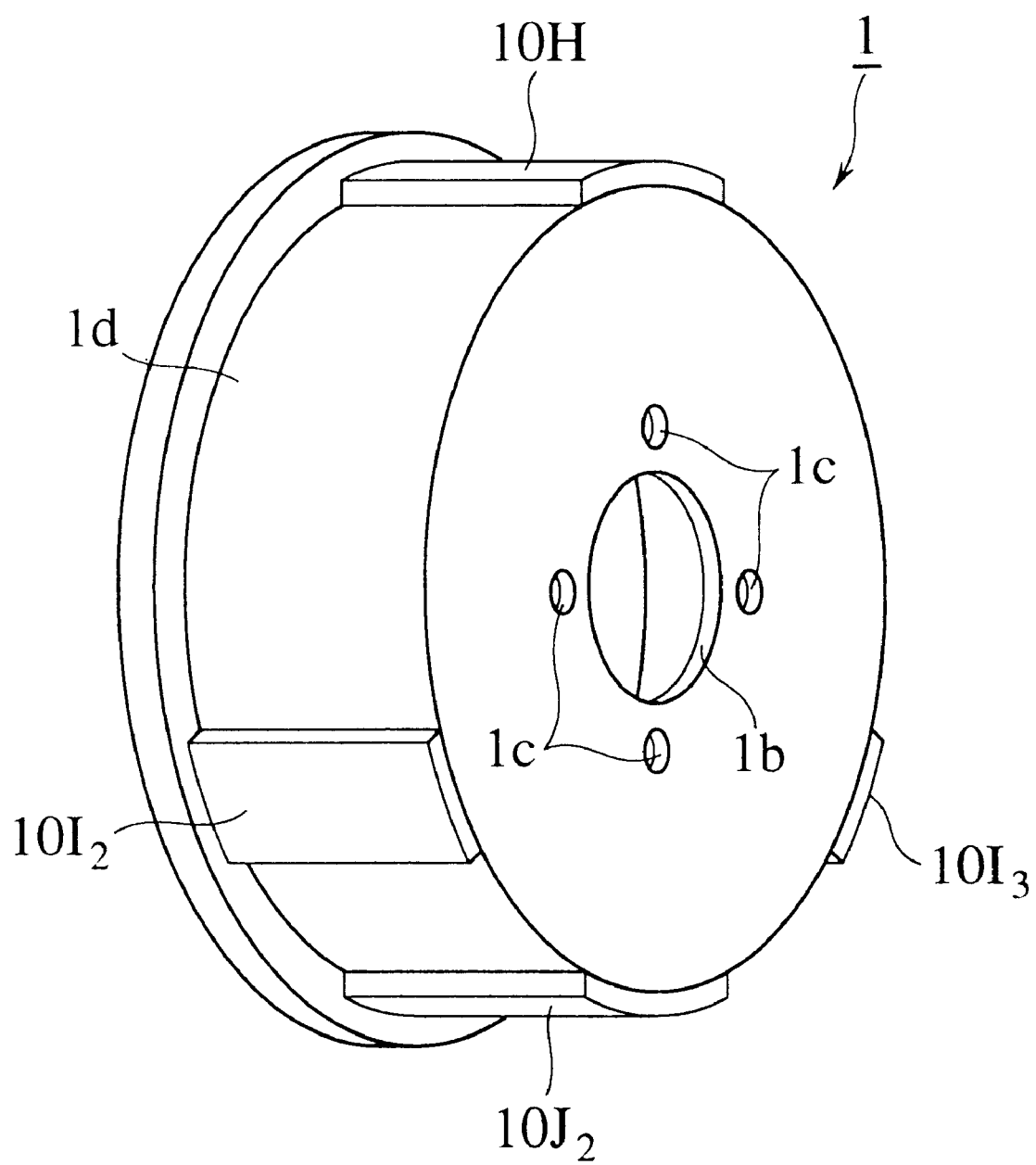
FIG. 13 is a perspective view showing a brake drum according to a third embodiment of the present invention.
Figure 14:
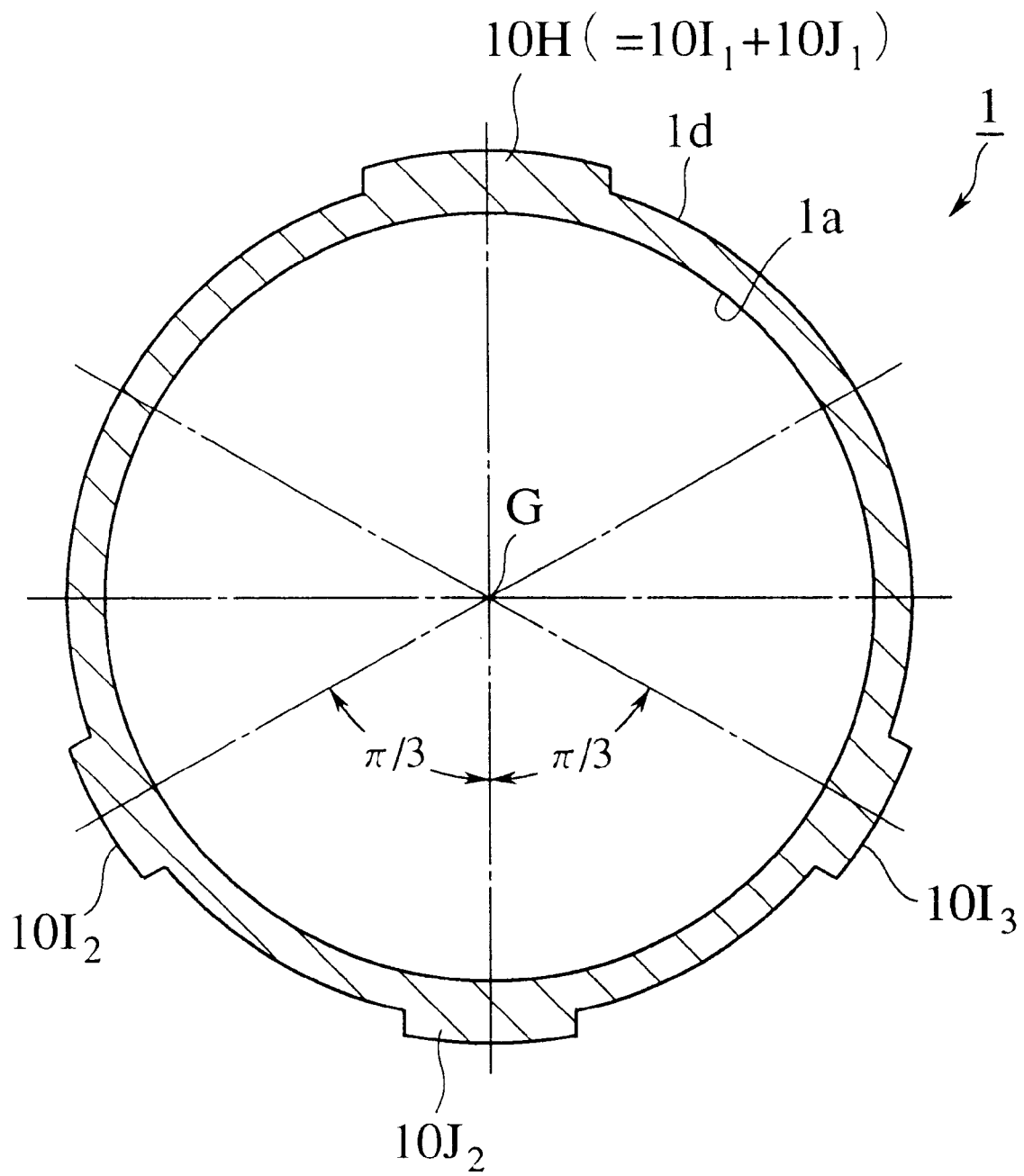
FIG. 14 is a sectional view showing an axially central portion of the brake drum according to the third embodiment in FIG. 13.

FIGS. 13 and 14 are views showing a brake drum according to a third embodiment of the present invention. In the third embodiment, like the first embodiment, the present invention is applied to the brake drum 1 serving as the rotating cooling wheel for use in the drum brake. Like references used in the first embodiment are labeled to the like parts in the third embodiment and their redundant descriptions are omitted.

As shown in FIG. 13 being a perspective view and FIG. 14 being a sectional view showing the axially central portion of the brake drum 1, like the first embodiment, a plurality of thick portions 10H, 10I$_2$, 10I$_3$ and 10J$_2$ are formed on the outer peripheral surface 1d of the brake drum 1 in the third embodiment, but the number and the arrangement locations thereof are different from those formed in the first embodiment.

That is, in the third embodiment, four thick portions 10H to 10J$_2$ are formed. The thick portions 10H and 10J$_2$ are separated by 180 degrees in the circumferential direction. The center-of-gravity location of the thick portion 10J$_2$ is used as a reference location. The thick portion 10I$_2$ is arranged at a location shifted counterclockwise by $\pi/3$ from the reference location in the circumferential direction in FIG. 14. The thick portion 10I$_3$ is arranged at a location shifted clockwise by $\pi/3$ from the reference location in the circumferential direction in FIG. 14.

Assume that thick portions 10I$_2$ and 10I$_3$ have the same shape and each has a mass of $M_{1I}$. Then, if it is assumed that a mass of the thick portion 10H is $M_{1H}$ and a mass of the thick portion 10J$_2$ is $M_{1J}$, the following expressions can be derived among these masses $M_{1H}$ to $M_{1J}$.

$$M_{1H} > M_{1I} > M_{1J} > 0 \tag{4}$$

$$M_{1H} = M_{1I} + M_{1J} \tag{5}$$

If relations given by the expressions (4), (5) are satisfied among these masses $M_{1H}$ to $M_{1J}$, the thick portion 10H with mass $M_{1H}$ may be regarded as a thick portion in which the thick portion 10I$_1$ with mass $M_{1H}$ and the thick portion 10J$_1$ with mass $M_{1J}$ are unified together. Thus, on an outer surface 1d of the brake drum 1 are formed three thick portions 10I$_1$ to 10I$_3$ each having mass $M_{1H}$ and separated at an equal distance in the circumferential direction from a reference line which is formed of an arbitrary diameter, and two thick portions $10J_1$ to $10J_2$ each having mass $M_{1J}$ and separated at an equal distance in the circumferential direction from the same reference line.

In summary, on the outer surface $1d$ of the brake drum 1 are formed a total of 5 thick portions which can be classified into two groups ($10I_1$ to $10I_3$, and $10J_1$ to $10J_2$), each group having identical masses. Thick portions in respective groups are arranged at an equal distance in the circumferential direction.

The above structure is nothing less than that the thick portions with equal mass are arranged at an equal distance in the circumferential direction even though a lot of thick portions 10H, $10I_2$, $10I_3$, and $10J_2$ are actually formed on the outer surface $1d$ of the brake drum 1. Hence, like the first embodiment, if the brake drum 1 is rotated together with the wheel at high speed, rotational balance is not disturbed.

Since three thick portions $10I_1$ to $10I_3$ act as additional masses when the brake drum 1 is rotated, multiple roots can be separated effectively in the diametral three-, six- and nine-node modes based on above Table I. Similarly, since two thick portions $10J_1$ and $10J_2$ act as additional masses, multiple roots can be separated effectively in the diametral two-, four-, eight- and ten-node modes based on above Table I. Accordingly, like the first embodiment, multiple roots can be separated against not only one order but also multiple orders of the mode, and as a result the brake noises can be suppressed and a noise level can be decreased.

In addition, there can be achieved such advantages that, since the number of the thick portions 10H to $10J_2$ is suppressed to four, the mold is rendered simple and increase in the unsprung mass can be suppressed further. Other advantages are analogous to those of the first embodiment.

Fourth Embodiment

Figure 15:
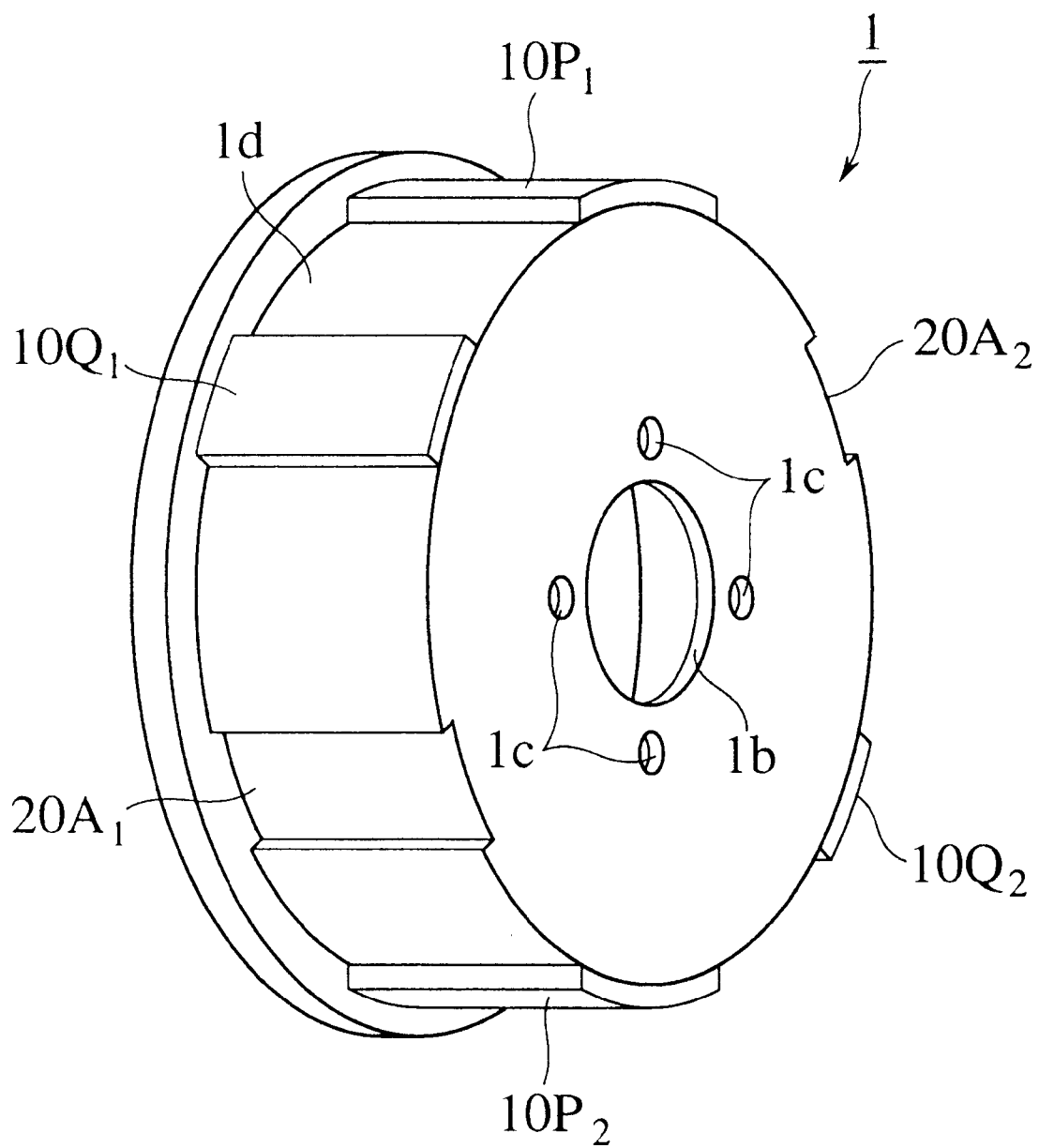
FIG. 15 is a perspective view showing a brake drum according to a fourth embodiment of the present invention.
Figure 16:
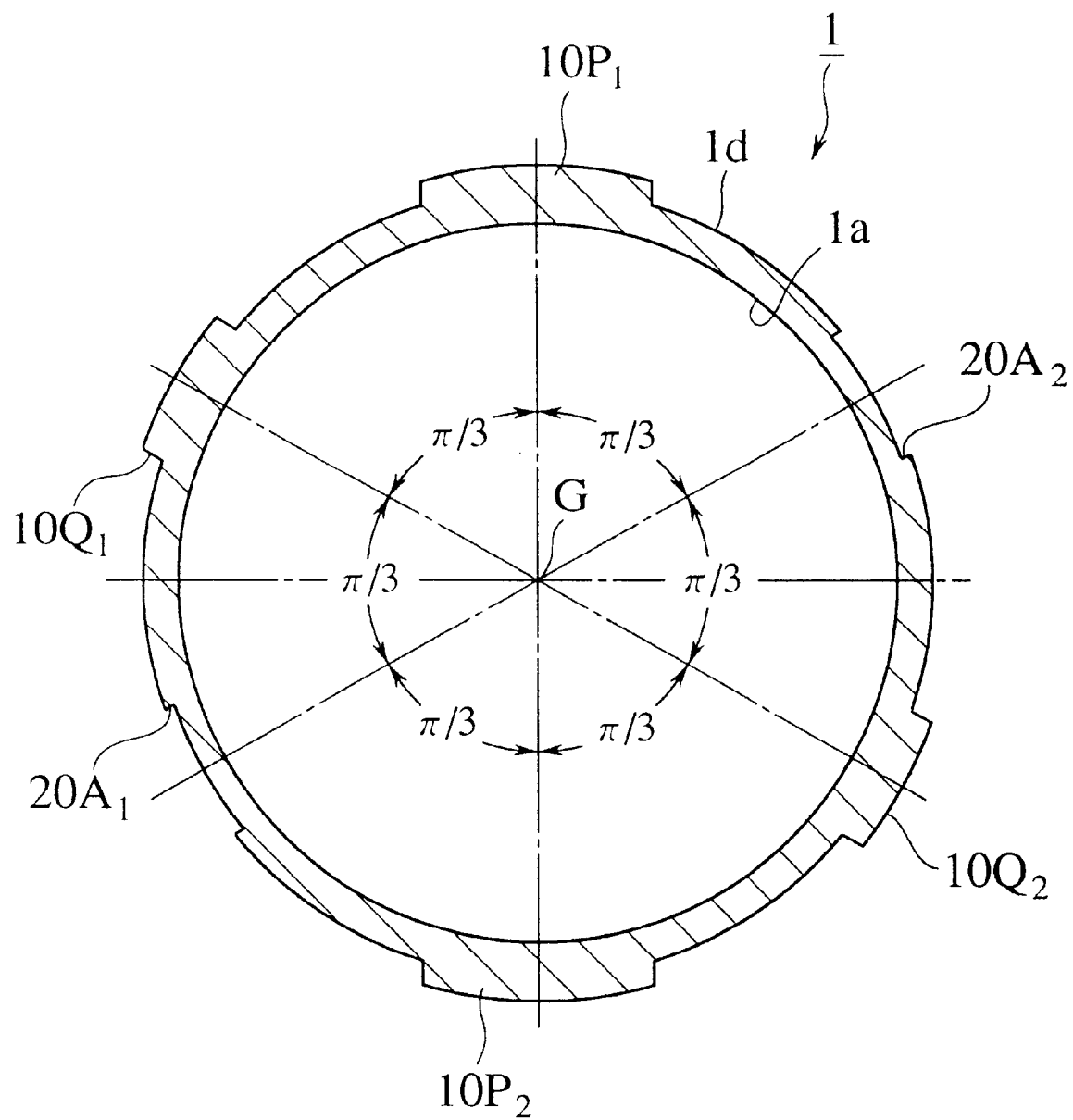
FIG. 16 is a sectional view showing an axially central portion of the brake drum according to the fourth embodiment in FIG. 15.
Figure 17:
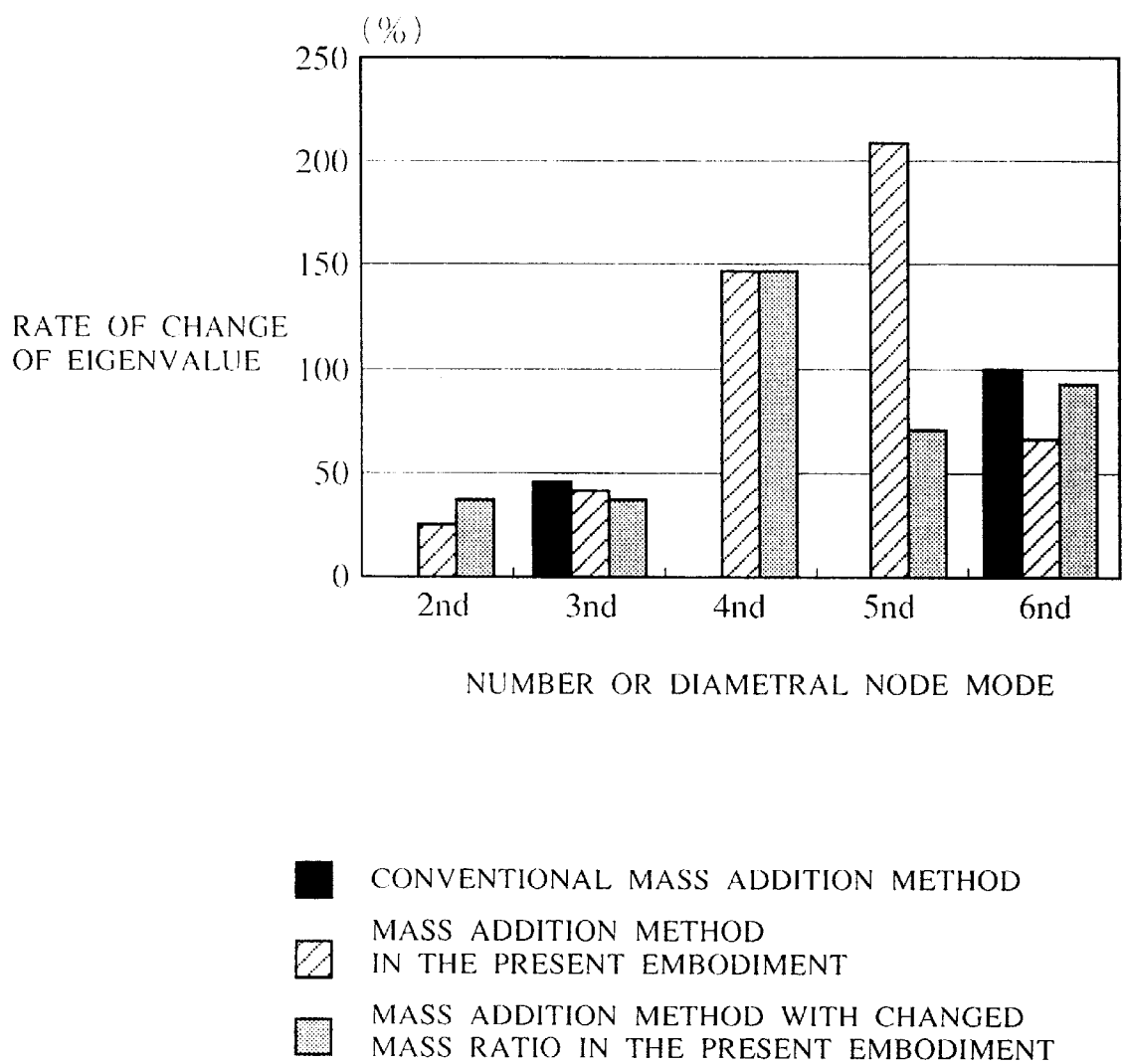
FIG. 17 is a graph illustrating advantages derived from the fourth embodiment.

FIGS. 15 to 17 are views showing a brake drum according to a fourth embodiment of the present invention. In the fourth embodiment, the present invention is applied to the brake drum 1 serving as the rotating cooling wheel for use in the drum brake. Like references used in the first embodiment are labeled to the like parts in the fourth embodiment and their redundant descriptions are omitted.

As shown in FIG. 15 being a perspective view and FIG. 16 being a sectional view showing the axially central portion of the brake drum 1, on the outer peripheral surface $1d$ of the brake drum 1 in the fourth embodiment are formed four thick portions $10P_1$, $10P_2$, $10Q_1$ and $10Q_2$ serving as mass/rigidity varying portion and two thin portions $20A_1$ and $20A_2$ serving as mass/rigidity varying portion.

If it is assumed that thick portions $10P_1$ and $10P_2$ have the same shape and each has a mass of $M_{1P}$, thick portions $10Q_1$ and $10Q_2$ have the same shape and each has a mass of $M_{1Q}$, and thin portions $20A_1$ and $20A_2$ have the same shape and each has a mass of M2A, following expression can be derived among these masses $M_{1P}$, $M_{1Q}$ and M2A.

$$M_{1P} > M_{1Q} > 0 > M_{2A} \tag{6}$$

These thick portions $10P_1$ to $10Q_2$ and thin portions $20A_1$ and $20A_2$ are arranged at an equal distance in the circumferential direction. However, the thick portions $10P_1$ and $10P_2$ having identical mass are arranged to be separated by 180 degrees in the circumferential direction such that they oppose each other to put the center axis of rotation of the brake drum 1 therebetween. The thick portions $10Q_1$ and $10Q_2$ having identical mass are also arranged similarly, and the thin portions $20A_1$ and $20A_2$ having identical mass are arranged in a similar manner.

With the above structure, since a resultant center of gravity G of these thick portions $10P_1$ to $10Q_2$ and thin portions $20A_1$ and $20A_2$ is situated at the center axis of rotation of the brake drum 1, rotational balance is not lost, like the first embodiment, if the brake drum 1 is rotated together with the wheel at high speed.

An equation of motion of the brake drum 1 in which the thick portions $10P_1$ to $10Q_2$ and the thin portions $20A_1$ and $20A_2$ are not formed at all is $$([K] - \omega^2 [M])\{X\} = \{F\} \tag{7}$$

Where K is a rigidity matrix, ω is a circular frequency, M is a mass matrix, x is a displacement vector, F is a load (external force). "[ ]" denotes a matrix form, and "{ }" denotes a vector form.

Modal analysis of the equation (7) yields $$([\cdot k \cdot] - \omega^2 [\cdot m \cdot])\{\lambda\} = \{f_i\} \tag{8}$$

Where [·k·], [·m·] are diagonal matrices, and given by $$[\cdot k \cdot] = [\phi]^T [K][\phi]$$

$$[\cdot m \cdot] = [\phi]^T [M][\phi]$$

where [φ] is a modal matrix, and {λ} is a modal coordinate.

The above equation (8) is a discontinuous motion equation and can therefore be separated into a single-degree-of-freedom system/spring-mass system equation for the diametral i-node mode. That is, $$(k_i - \omega^2 m_i)\lambda_i = 0 \tag{9}$$

can be obtained. Where an eigenfrequency $\omega_i$ is $$\omega_i = (k_i / m_i)^{1/2} \tag{10}$$

On the contrary, an equation of motion of the brake drum 1 in which the thick portions $10P_1$ to $10Q_2$ and the thin portions $20A_1$ and $20A_2$ are formed is $$([K] - \omega^2 [M + \Delta M])\{X\} = \{F\} \tag{11}$$

Using the modal matrix [φ] derived approximately from the equation (7), if this equation (11) is separated for the diametral i-node mode, $$\{k_i - \omega^2 (m_i + \Delta m_i)\}\lambda_i = 0 \tag{12}$$

can be obtained. Where $$\Delta m_i = \{\phi_{i}\}^T [\Delta M]\{\phi\}$$

Accordingly, since eigenfrequency $\omega_1'$ can be obtained from thick portion [ΔM] as $$\omega_i' = \{k_i / (m_i + \Delta m)\}^{1/2} \tag{13}$$

an increment $\Delta \omega_i$ of the eigenfrequency is $$\begin{aligned} \Delta \omega_i &= (k_i / m_i)^{1/2} - \{k_i / (m_i + \Delta m_i)\}^{1/2} \\ &= (k_i / m_i)^{1/2} \{1 - \{\{k_i / (m_i + \Delta m_i)\} / \\ &\quad (k_i / m_i)\}^{1/2}\} \end{aligned} \tag{14}$$

-continued $$= \omega_0\{1 - 1/(1 + \Delta m_i/m_i)^{1/2}\}$$

$$\approx \omega_0(\Delta m_i/2m_i)$$

In other words, in general, if the eigenmode $\{\phi\}$ is known, a variation $\Delta f$ of the resonance frequency can be given approximately as, $$\Delta f = f_0(\Delta m_i/2m) \quad (15)$$

Where $f_0$ is original resonance frequency, m is modal mass, and $\Delta mi = \{\phi_i\}^T[\Delta M]\{\phi_i\}$.

As a result of computing variation of the eigenvalue in two multiple root moods based on equation (15), it is understood that multiple roots can be separated for all node modes although six additional masses which are formed of the thick portions $10P_1$ to $10Q_2$ and the thin portions $20A_1$ and $20A_2$ are provided in the fourth embodiment. For the conventional mass addition method in which three additional masses set forth in the above official gazette are formed, the mass addition method according to the fourth embodiment, and the case where mass ratio is changed in the fourth embodiment, results illustrated in FIG. 17 can be derived when rate of change of eigenvalue is calculated for diametral two-six nodes by the finite element method. That is, it is appreciated that, with the use of the structure of the fourth embodiment having three kinds of two additional masses, multiple roots can be separated throughout the diametral two-six nodes although the number of additional masses is six. In summary, since multiple roots in diametral node modes of multiple order can be separated unless a large number of additional masses are formed, there can be achieved such advantages that significant increase in weight of the brake drum 1 and complication of the mold can be avoided and that extreme increases in the unsprung mass and manufacturing cost of the mold are not caused.

From the results of FIG. 17, it can be seen that, by merely changing a ratio of mass in three kinds of additional masses, rate of change of eigenvalue in respective modes (i.e., degree of separation of multiple root) can also be varied. Therefore, another advantage can be attained that degree of freedom to which the resonance frequency may be set arbitrary in respective node modes is enhanced.

Other advantages of the fourth embodiment are similar to those achieved by the first embodiment.

Fifth Embodiment

Figure 18:
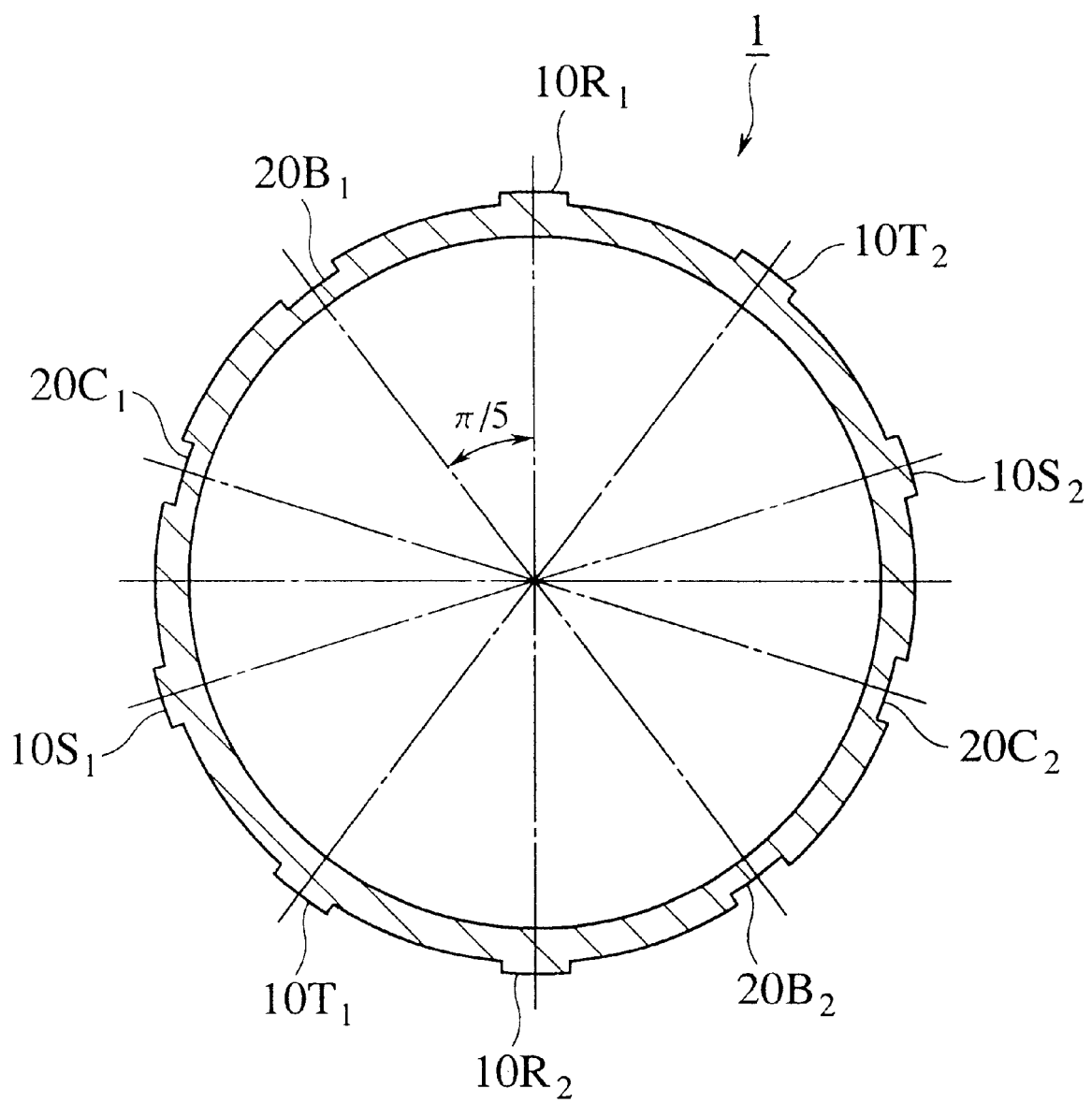
FIG. 18 is a sectional view showing an axially central portion of a brake drum according to a fifth embodiment of the present invention.
Figure 19:
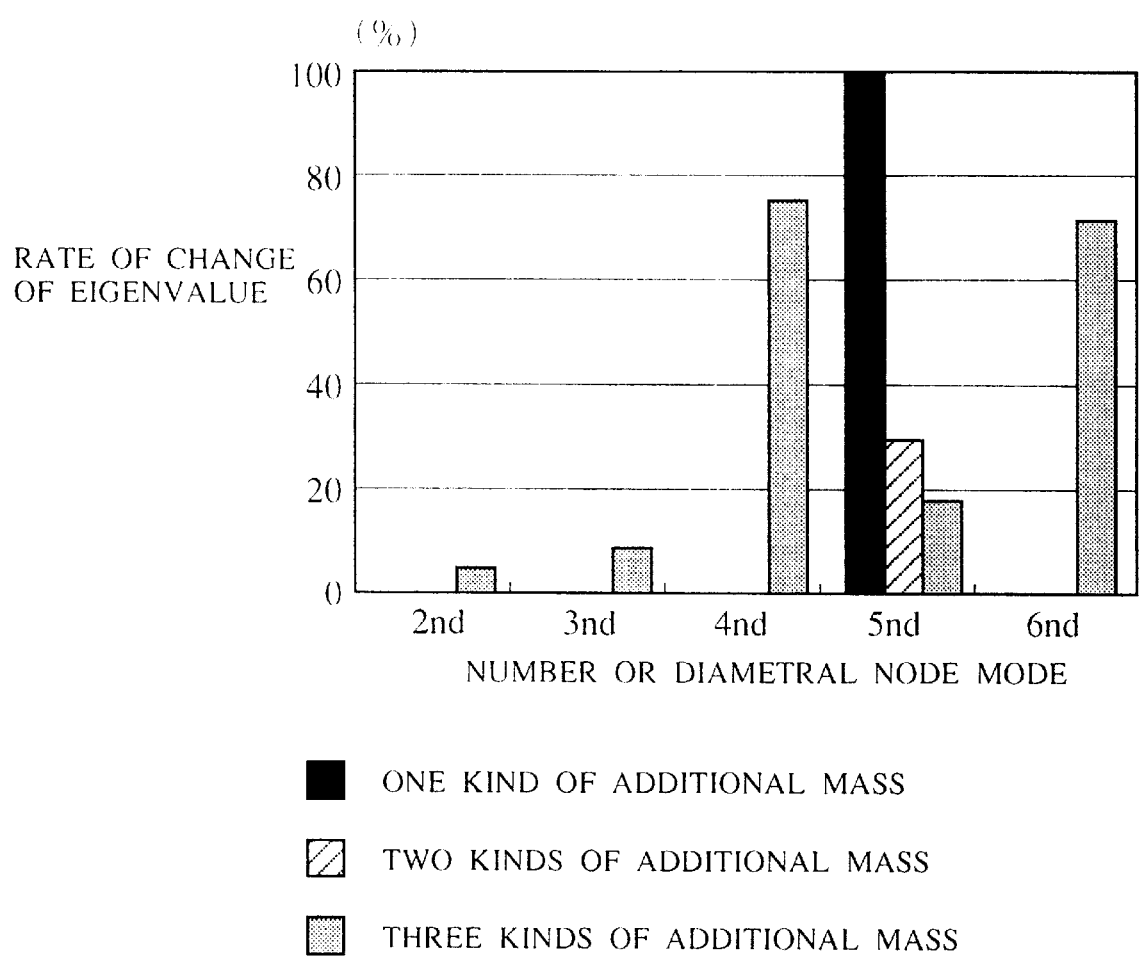
FIG. 19 is a graph illustrating advantages derived from the fifth embodiment.

FIGS. 18 and 19 are views showing a brake drum according to a fifth embodiment of the present invention. In the fifth embodiment, the present invention is applied to the brake drum 1 acting as the rotating cooling wheel for use in the drum brake. Like references used in the first embodiment are labeled to the like parts in the fifth embodiment and their redundant descriptions are omitted.

More particularly, as shown in FIG. 18 being a sectional view showing the axially central portion of the brake drum 1, on the outer peripheral surface $1d$ of the brake drum 1 in the fifth embodiment are formed six thick portions $10R_1$, $10R_2$, $10S_1$, $10S_2$, $10T_1$ and $10T_2$ serving as mass/rigidity varying portion and four thin portions $20B_1$, $20B_2$, $20C_1$ and $20C_2$ serving as mass/rigidity varying portions.

If it is assumed that thick portions $10R_1$ and $10R_2$ have the same shape and each has a mass of $M_{1R}$, thick portions $10R_1$ and $10R_2$ have the same shape and each has a mass of $M_{1R}$, thick portions $10S_1$ and $10S_2$ have the same shape and each has a mass of $M_{1S}$, thick portions $10T_1$ and $10T_2$ have the same shape and each has a mass of $M_{1T}$, thin portions $20B_1$ and $20B_2$ have the same shape and each has a mass of $M_{2B}$, and thin portions $20C_1$ and $20C_2$ have the same shape and each has a mass of $M_{2C}$, following expressions can be derived among these masses $M_{1R}$, $M_{1S}$, $M_{1T}$, $M_{2B}$ and $M_{2C}$.

$$M_{1R}, M_{1S}, M_{1T} > 0 > M_{2B}, M_{2C} \quad (16)$$

$$M_{1R} \neq M_{1S} \neq M_{1T} \neq M_{2B} \neq M_{2C} \quad (17)$$

Six thick portions $10R_1$ to $10T_2$ and four thin portions $20B_1$ to $20C_2$ are arranged at an equal distance in the circumferential direction. However, the thick portions $10R_1$ and $10R_2$ having identical mass are arranged to be separated by 180 degrees in the circumferential direction such that they oppose to each other to put the center axis of rotation of the brake drum 1 therebetween. The thick portions $10S_1$ and $10S_2$ and the thick portions $10T_1$ and $10T_2$ are arranged similarly. The thin portions $20B_1$ and $20B_2$ and the thin portions $20C_1$ and $20C_2$ are arranged similarly.

With the above structure, since a resultant center of gravity G of these thick portions $10R_1$ to $10T_2$ and thin portions $20B_1$ and $20C_2$ is situated at the center axis of rotation of the brake drum 1, rotational balance is never lost, like the first embodiment, if the brake drum 1 is rotated together with the wheel at high speed.

In the event that ten mass/rigidity varying portions are arranged at an equal distance in the circumferential direction like the fifth embodiment, in order to disturb the rotational balance, three cases can be considered in mass relations among respective mass/rigidity varying portions as follows.

1) All mass/rigidity varying portions are formed to have identical mass (one kind of additional mass).

2) Five mass/rigidity varying portions are formed every two kinds each having different mass, and mass/rigidity varying portions having identical mass are arranged every $2\pi/5$ in the circumferential direction (two kinds of additional mass).

3) Two mass/rigidity varying portions are formed every five kinds each having different mass, and mass/rigidity varying portions having identical mass are arranged every $\pi$ in the circumferential direction (three kinds of additional mass).

As with the arrangement methods 1) to 3), when a rate of change of eigenvalue is calculated by the finite element method respectively, the results shown in FIG. 19 have been derived. From the above results, it is understood that multiple roots can be separated in many diametral node modes only in the case 3).

According to this finding, when separability of multiple roots is examined on respective mass/rigidity varying portions having total number N=4, 6, 8, 9, 10 and 12, the results shown in Table II have been derived. Where M is the number of kind of mass/rigidity varying portion, $\theta$ is a distance between mass/rigidity varying portions in the circumferential direction (degree), and i is order of the diametral node mode.

From the results shown in Table II, inventors of the present invention reach the conclusion that, if the total number N of the mass/rigidity varying portions is set to a non-prime number greater than four and (½)N kinds of mass/rigidity varying portions, each kind having different mass, are arranged such that mass/rigidity varying portions having identical mass are separated by 180 degrees in the circumferential direction and opposed to put the center axis of rotation therebetween, multiple roots can be separated in many diametral node modes without disturbing the rotational balance.

TABLE II

| N | M | θ | i=2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 4 | 1 | 90  | O |   | O |   | O |   | O |   | O |   | O |   | O |   |
|   | 2 | 180 | O | O | O | O | O | O | O | O | O | O | O | O | O | O |
| 6 | 1 | 60  |   | O |   |   | O |   |   | O |   |   | O |   |   | O |
|   | 2 | 120 |   | O |   |   | O |   |   | O |   |   | O |   |   | O |
|   | 3 | 180 | O | O | O | O | O | O | O | O | O | O | O | O | O | O |
| 8 | 1 | 45  |   |   |   | O |   |   | O |   |   | O |   |   | O |   |
|   | 2 | 90  | O |   | O |   | O |   | O |   | O |   | O |   | O |   |
|   | 4 | 180 | O | O | O | O | O | O | O | O | O | O | O | O | O | O |
| 9 | 1 | 40  |   |   |   |   |   |   |   |   | O |   |   |   |   |   |
|   | 3 | 120 |   | O |   |   | O |   |   | O |   |   | O |   |   | O |
| 10| 1 | 36  |   |   |   | O |   |   |   |   | O |   |   |   |   | O |
|   | 2 | 72  |   |   |   | O |   |   |   |   | O |   |   |   |   | O |
|   | 5 | 180 | O | O | O | O | O | O | O | O | O | O | O | O | O | O |
| 12| 1 | 30  |   |   |   |   | O |   |   | O |   |   | O |   |   | O |
|   | 2 | 60  |   | O |   |   | O |   |   | O |   |   | O |   |   | O |
|   | 3 | 90  |   | O |   |   | O |   |   | O |   |   | O |   |   | O |
|   | 4 | 120 | O |   | O |   | O |   | O |   | O |   | O |   | O |   |
|   | 6 | 180 | O | O | O | O | O | O | O | O | O | O | O | O | O | O |

Therefore, according to the structure of the fifth embodiment, since multiple roots can be separated in many diametral node modes of multiple order without disturbing the rotational balance, like the first embodiment, a possibility is extremely small that the spatially fixed mode is caused and sound radient efficiency is reduced. As a result, brake noises can be suppressed and noise level is reduced.

In addition, other advantages can be attained, because only six thick portions $10R_1$ to $10T_2$ and four thin portions $20B_1$ to $20C_2$ are needed according to the structure of the fifth embodiment, extreme increases in the unsprung mass and manufacturing cost of the mold are not caused.

There are still other advantages that, even if total number N of the thick portions and the thin portions are set to a relatively large number such as 10 or 12 in compliance with Table II, their arrangement locations and their masses can be determined very simply. In other words, at first a total number N of the thick portions and the thin portions is selected from non-prime numbers in excess of four, then arrangement locations of the thick portions and the thin portions (arrangement locations of mass/rigidity varying portions) are set at N locations separated at an equal distance in the circumferential direction on the outer peripheral surface $1d$ of the brake drum 1, and then (½)N kinds of mass/rigidity varying portions each kind having different mass are allocated at the N locations such that respective two thick portions or thin portions having identical mass are opposed so as to put the center axis of rotation therebetween.

In the structure of the fifth embodiment, it is feasible to alter rate of change of einenvalue (degree of separation of multiple root) in respective modes by only changing a ratio of mass of additional mass.

Sixth Embodiment

Figure 20:
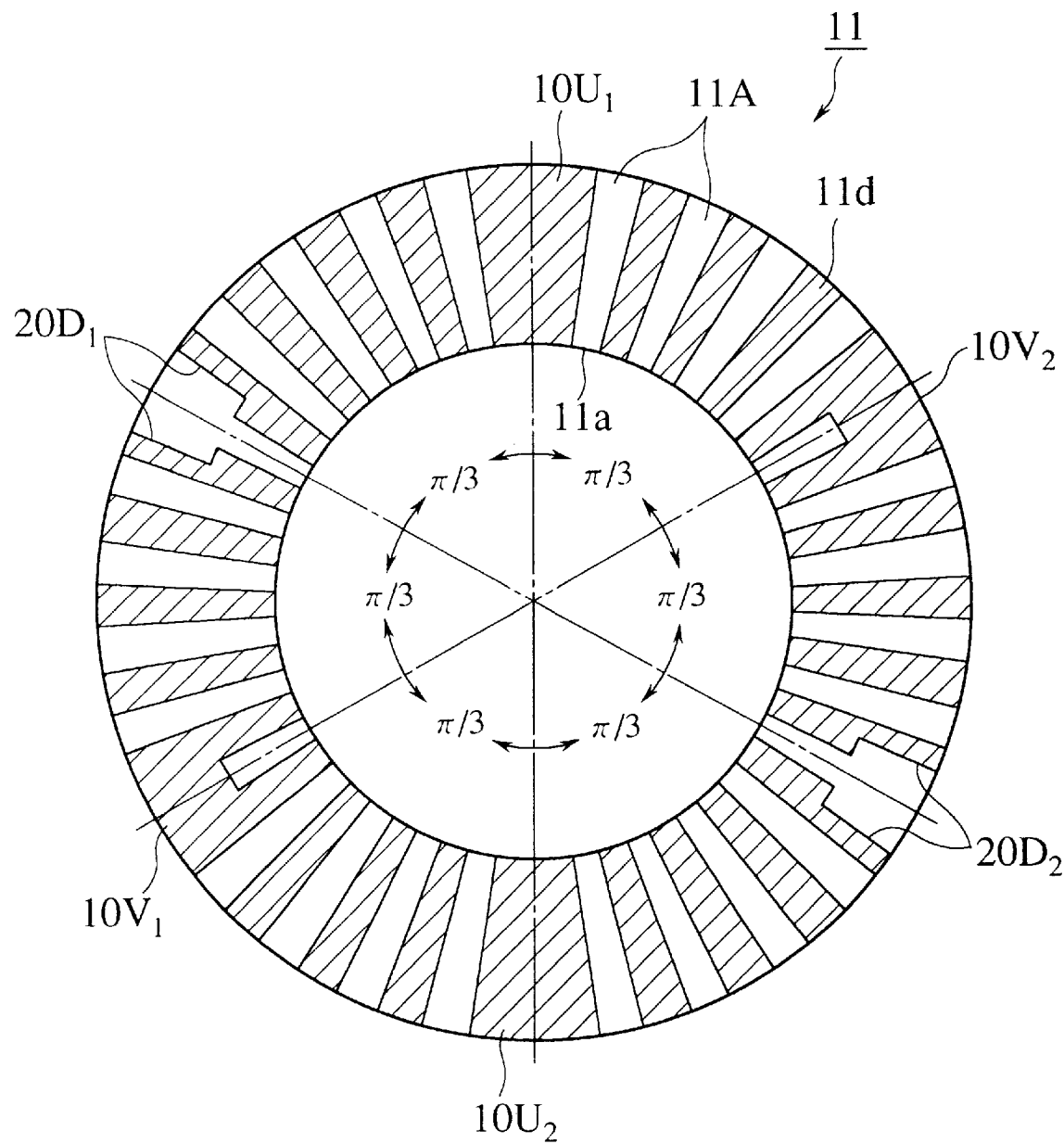
FIG. 20 is a sectional view showing an axially central portion of a brake drum according to a sixth embodiment of the present invention.

FIG. 20 is a sectional view showing an axially central portion of a brake drum according to a sixth embodiment of the present invention. In the sixth embodiment, a structure similar to that of the fifth embodiment is applied to the ventilated rotor 11 for use in the disk brake like the second embodiment.

More particularly, in the sixth embodiment, thick portions $10U_1$, $10U_2$, $10V_1$, $10V_2$ and thin portions $20D_1$, $20D_2$ are formed as six mass/rigidity varying portions on inner surfaces of ventilating holes 11 of the ventilated rotor 11 so as to be separated at an equal distance in the circumferential direction. Respective identical mass portions of the thick portions $10U_1$ to $10V_2$ and thin portions $20D_1$, $20D_2$ are arranged symmetrically to each other with respect to the center axis of rotation. Hence, the ventilated rotor 11 in the sixth embodiment corresponds to a case where N=6 and M=3 in Table II.

Therefore, according to the structure of the sixth embodiment, since multiple roots can be separated in many diametral node modes of multiple order without disturbing the rotational balance, like the first embodiment, there is an extremely small possibility that the spatially fixed mode is caused and sound radient efficiency is reduced. As a result, brake noises can be suppressed and noise level is reduced.

In addition, in the sixth embodiment, since total number of the thick portions and the thin portions is suppressed to six, i.e., relatively small number, these portions do not disturb so much air flows passing in the ventilating holes 11A from the inner peripheral surfaces $11a$ to the outer peripheral surfaces $11d$. Accordingly, a more stable cooling performance can be maintained in contrast to the structure of the second embodiment.

In the sixth embodiment, masses of the brake drum 1 or the ventilated rotor 11 are partially increased or decreased at predetermined locations in the circumferential direction by providing the thick portions and the thin portions. However, as has been explained previously with reference to FIGS. 1A and 2B, since rigidity may be increased or decreased in order to separate multiple roots, a structure for varying rigidity may be used as the mass/rigidity varying portions in place of the structures explained in the above embodiments wherein mass is increased or decreased. However, in practice, the thick portions and the thin portions explained in the above embodiments may serve to vary mass as well as rigidity at arrangement locations. In other words, if ratios of thickness of the thick portions and the thin portions to widths thereof in the circumferential direction being taken into consideration, varying function for mass is emphasized when the thickness is increased with respect to the width, alternatively varying function for rigidity is amplified when the width is increased with respect to the thickness.

However, since it is troublesome with respect to technology and not advisable with respect to cost to increase or decrease only rigidity without varying mass, it is most desirable that both mass and rigidity are increased or decreased appropriately by selecting suitable thicknesses and widths of the thick portions and/or the thin portions formed in the above embodiments. In this event, as can be seen from the above equation (13), increase in mass tends to reduce the resonance frequency while increase in rigidity tends to increase the resonance frequency. Therefore, if this tendency is considered, it is possible to tune the resonance frequency more finely.

Seventh Embodiment

Figure 21:
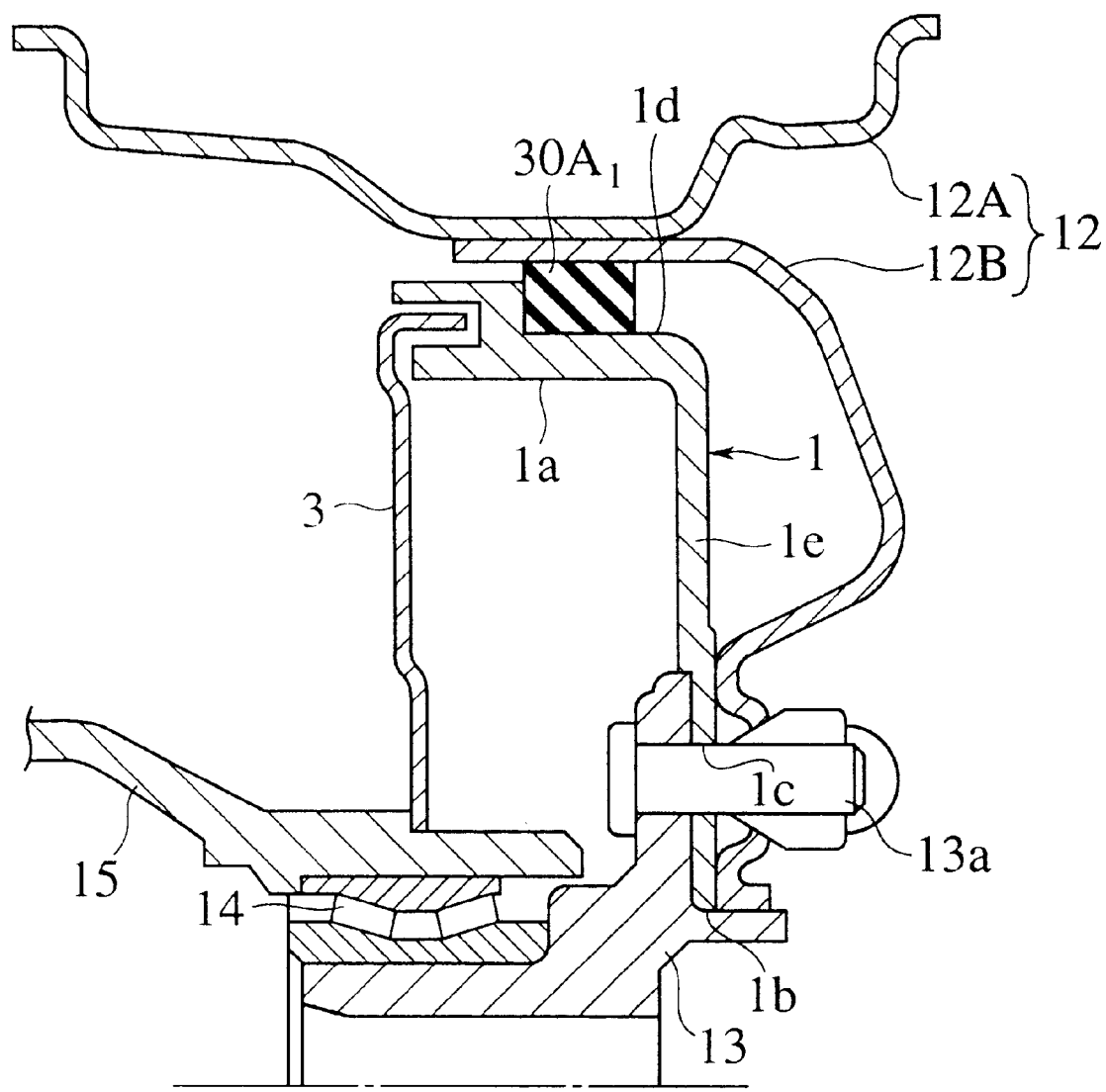
FIG. 21 is a sectional view showing a structure of a drum brake according to a seventh embodiment of the present invention.
Figure 22:
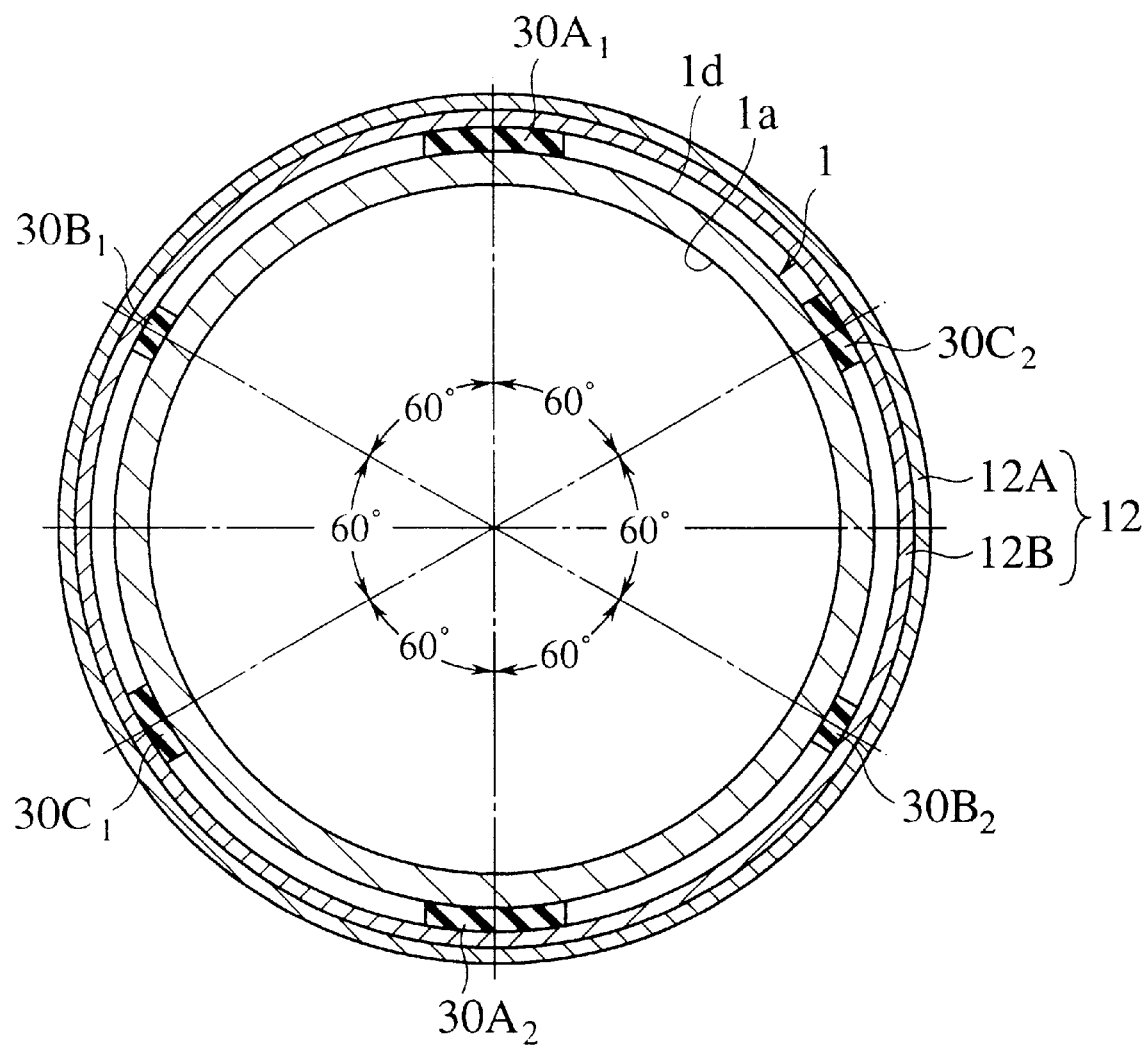
FIG. 22 is a sectional view showing an axially central portion of a brake drum used in the drum brake according to the seventh embodiment in FIG. 21.

FIGS. 21 and 22 are views showing a drum brake according to a seventh embodiment of the present invention. FIG. 21 is a sectional view showing a structure (upper half) of the drum brake according to the seventh embodiment. FIG. 22 is a lateral sectional view showing an axially central portion of the brake drum used in the drum brake according to the seventh embodiment. Like references used in the above embodiments and the conventional drum brake are labeled to the like parts in them, and their redundant descriptions are omitted.

More specifically, the brake drum 1 together with a road wheel 12 consisting of a rim 12A and a wheel disk 12B is secured to a hub 13 via a hub volt 13a. Thus the brake drum 1 is rotated together with the wheel. A tire (not shown) is fitted into an outer peripheral surface of the rim 12A and the wheel is made up of the tire and the road wheel 12. The hub 13 is supported rotatably to an axle housing 15 via a bearing 14, and the back plate 3 is secured to the axle housing 15.

Six elastic members $30A_1$, $30A_2$, $30B_1$, $30B_2$, $30C_1$, $30C_2$ formed of a rubber-like elastic body are intervened between the outer peripheral surface 1d of the brake drum 1 and an inner peripheral surface of the wheel disk 12B of the road wheel 12 under a compressed state in the radial direction such that they are arranged coaxially around the center axis of rotation of the brake drum 1 at six locations separated at an equal distance in the circumferential direction. Respective elastic members $30A_1$ to $30C_2$ are adhered to the outer peripheral surface 1d of the brake drum 1, and inserted into the inner peripheral surface of the wheel disk 12B to be compressed when being assembled.

Although respective elastic members $30A_1$ to $30C_2$ are formed by the same elastic material, two elastic members $30A_1$ and $30A_2$ are formed to have the same shape (maximum), another two elastic members $30B_1$ and $30B_2$ are formed to have the same shape (minimum), and remaining two elastic members $30C_1$ and $30C_2$ are formed to have the same shape (medium). The elastic members $30A_1$ and $30A_2$ are arranged at opposing locations to put the center axis of rotation of the brake drum 1 therebetween. The elastic members $30B_1$ and $30B_2$ and the elastic members $30C_1$ and $30C_2$ are also arranged respectively in a similar manner.

Namely, in the seventh embodiment, two elastic members are formed every three kinds having different rigidity. A total of six elastic members $30A_1$ to $30C_2$ are arranged at an equal distance in the circumferential direction. The elastic members $30A_1$ and $30A_2$, $30B_1$ and $30B_2$, and $30C_1$ and $30C_2$, each two members having equal rigidity, are arranged at opposing locations to put the center axis of rotation of the brake drum 1 therebetween, and the elastic members adjacent to each other in the circumferential direction have different rigidity.

According to this structure, since the elastic members $30A_1$ to $30C_2$ each having identical rigidity are located to sandwich the center axis of rotation of the brake drum 1 therebetween (in other words, the elastic members $30A_1$ to $30C_2$ each having identical rigidity are arranged to be separated by 180 degrees on the concentric circle), a resultant center of gravity of the whole elastic members $30A_1$ to $30C_2$ is located at the center axis of rotation of the brake drum 1. For this reason, even if the brake drum 1 rotates at high speed, the rotational balance is not lost.

Figure 23:
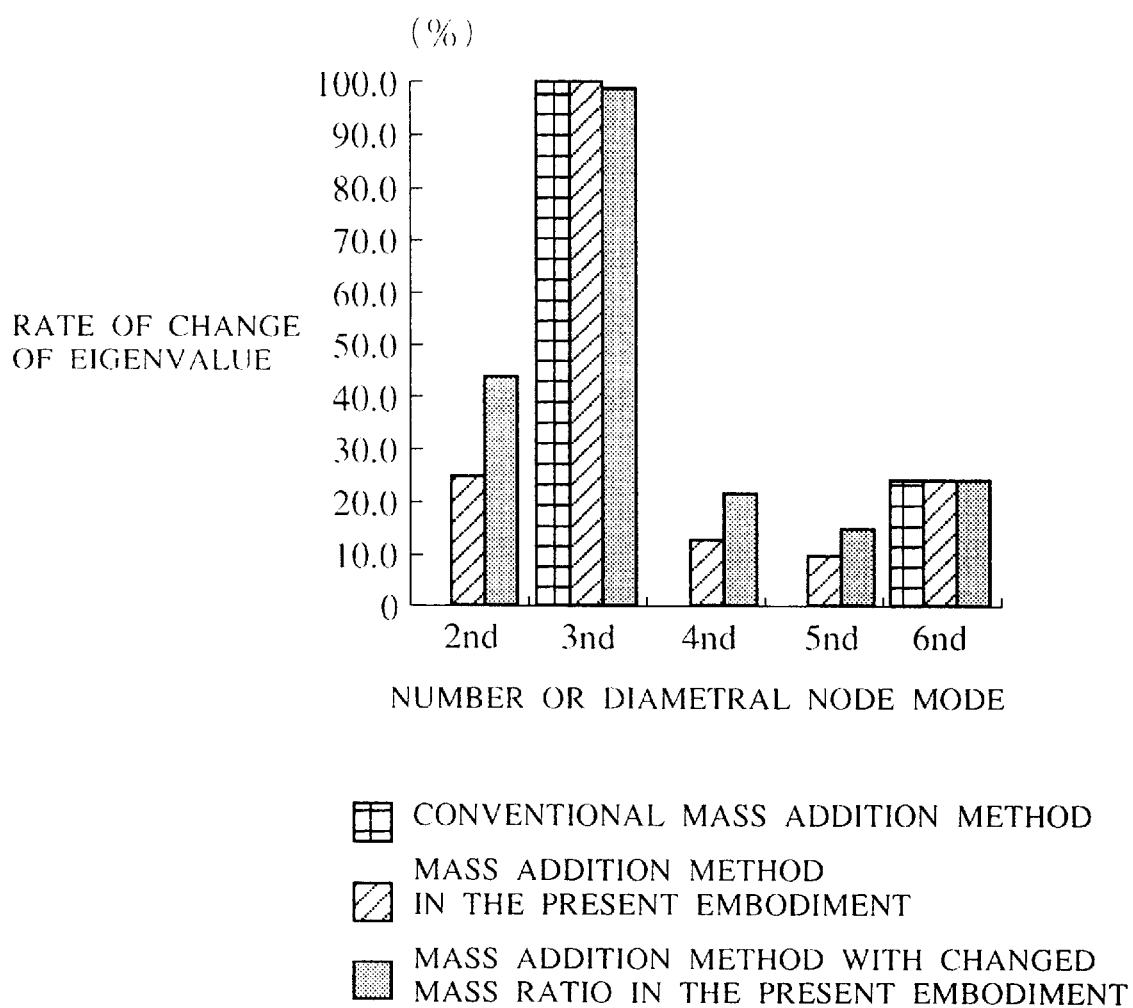
FIG. 23 is a graph illustrating advantages derived from the seventh embodiment.

On the contrary, in the structure of the seventh embodiment, when we have tried to compute eigenmode by the finite element method, the results shown in FIG. 23 have been derived. In FIG. 23, an abscissa indicates the node number of the diametral node mode, and an ordinate indicates a rate of change of eigenvalue. FIG. 23 illustrates the computed results of two kinds of elastic members $30A_1$ to $30C_2$ in which a ratio of rigidity is varied. Further, as a comparative example, the computed result of the rate of change of eigenvalue according to the above second prior art is also given in FIG. 23.

According to these computed results, it can be understood that, by making use of the structure of the seventh embodiment which are equipped with two elastic members every three kinds, multiple roots can be separated throughout the diametral two–six node modes although the number of elastic members $30A_1$ to $30C_2$ is six. That is, there can be obtained an advantage that multiple roots can be separated in many diametral node modes of multiple order unless the number of elastic members is extremely increased and an extreme increase in manufacturing cost is avoided.

From the results in FIG. 23, it is possible to the rate of change of einenvalue (degree of separation of multiple root) in respective modes by merely changing ratios of rigidity of three kinds of elastic members $30A_1$ to $30C_2$. Therefore, there is another advantage that a degree of freedom to which the resonance frequency may be set arbitrary in respective modes can be enhanced.

Eighth Embodiment

Figure 24:
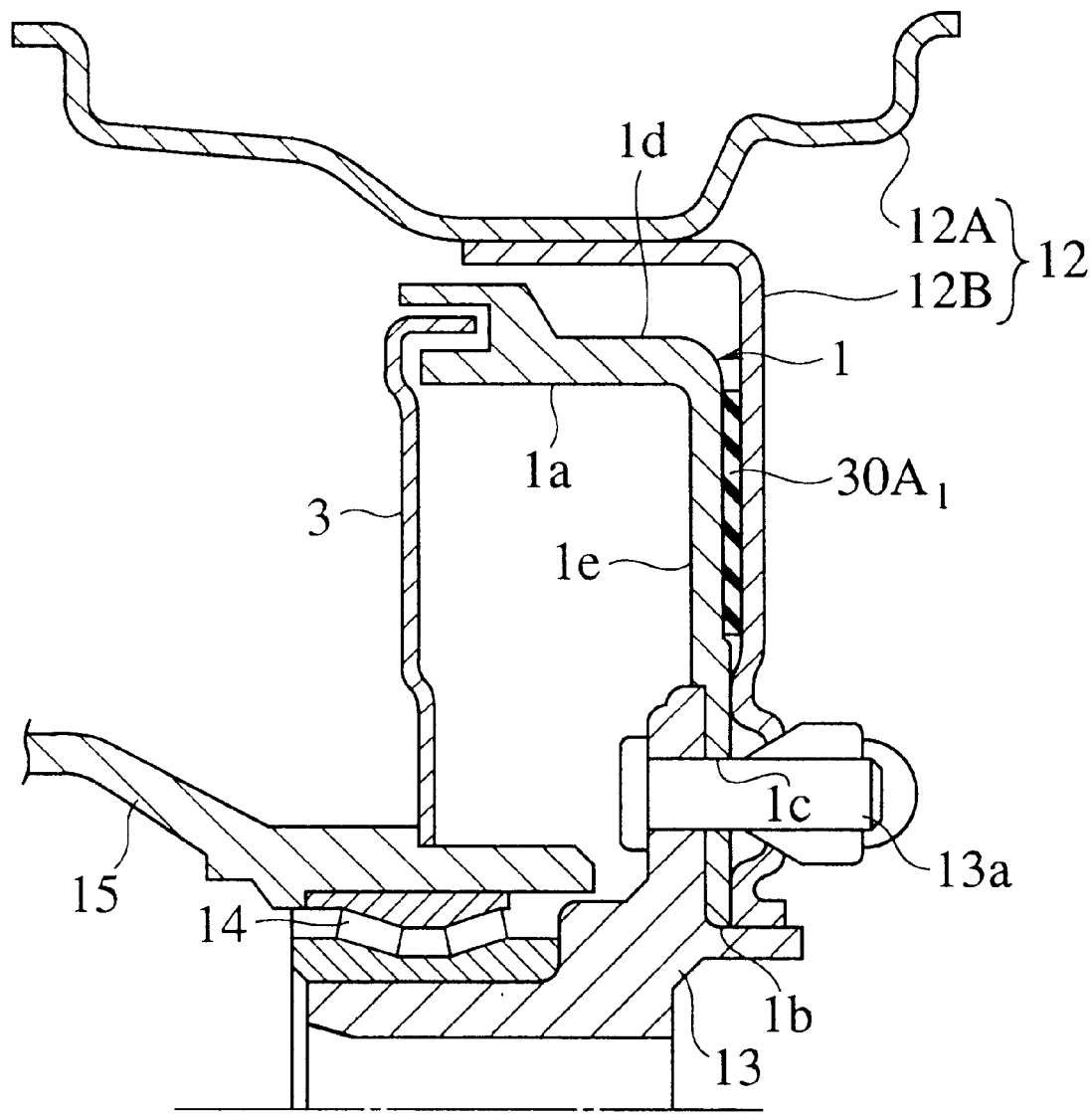
FIG. 24 is a sectional view showing a structure of a drum brake according to an eighth embodiment of the present invention.
Figure 25:
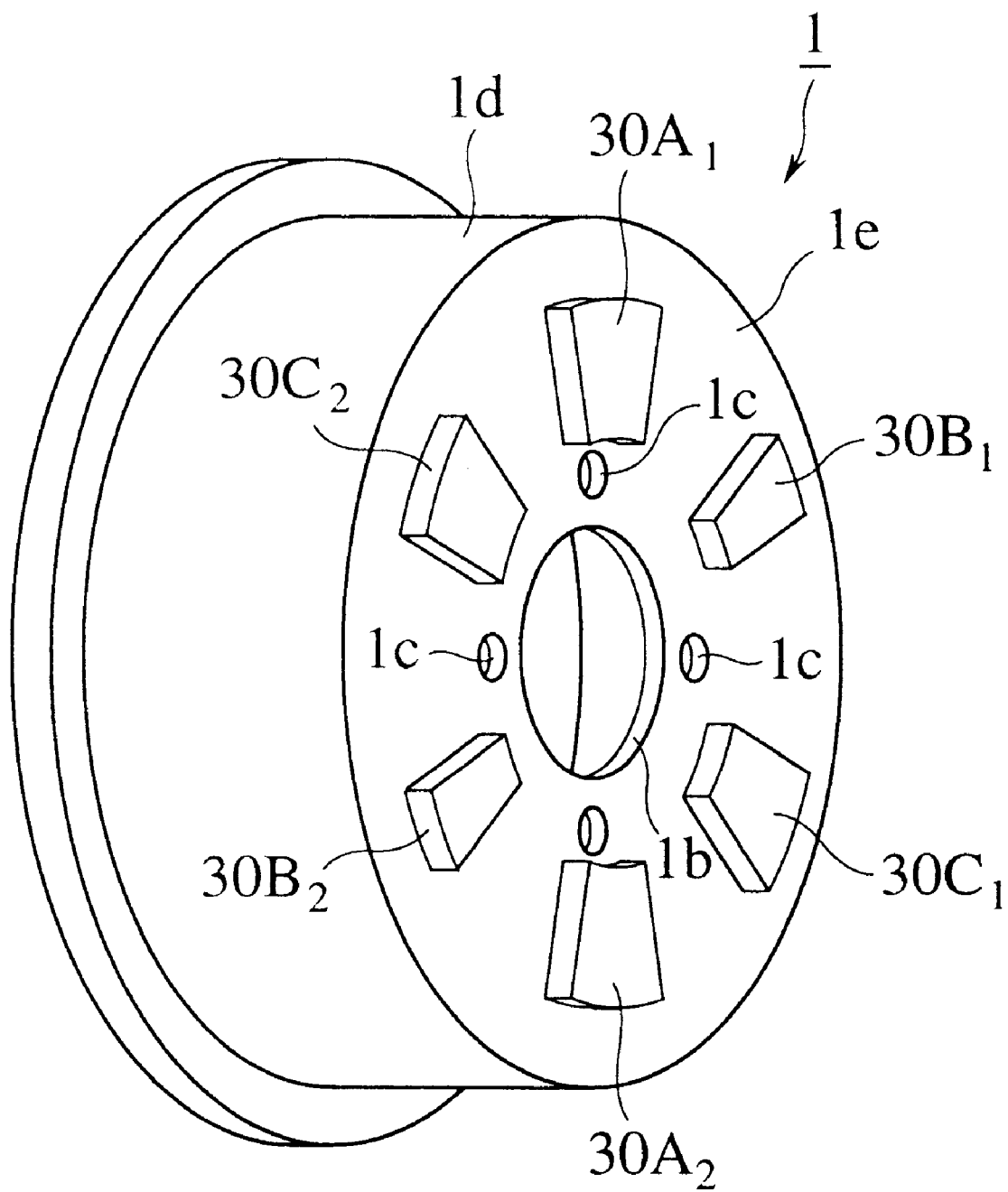
FIG. 25 is a sectional view showing a brake drum used in the drum brake according to the eighth embodiment in FIG. 24.

FIGS. 24 and 25 are views showing a drum brake according to an eighth embodiment of the present invention. FIG. 24 is a sectional view showing a structure (upperhalf) of the drum brake along the axis according to the eighth embodiment. FIG. 25 is a sectional view showing the brake drum 1 according to the eighth embodiment. Like references used in the above embodiments and the conventional drum brake are labeled to the like parts in them, and their redundant descriptions are omitted.

More specifically, like the seventh embodiment, the elastic members $30A_1$ to $30C_2$ are provided in the eighth embodiment, but respective elastic members $30A_1$ to $30C_2$ are intervened between the outer surface of a bottom 1e of the brake drum 1 and a side surface of the wheel disk 12B. Also in the eighth embodiment, the elastic members $30A_1$ to $30C_2$ are allocated coaxially around the center axis of rotation of the brake drum 1. Two elastic members $30A_1$ and $30A_2$ are formed to have the same shape (maximum), another two elastic members $30B_1$ and $30B_2$ are formed to have the same shape (minimum), and remaining two elastic members $30C_1$ and $30C_2$ are formed to have the same shape (medium). The elastic members $30A_1$ and $30A_2$ are arranged at opposing locations to put the center axis of rotation of the brake drum 1 therebetween. The elastic members $30B_1$ and $30B_2$ and the elastic members $30C_1$ and $30C_2$ are also arranged respectively in a similar manner.

Like the above, even if intervened locations of the elastic members $30A_1$ to $30C_2$ are altered, similar advantages to those of the seventh embodiment can be achieved.

Ninth Embodiment

Figure 26:
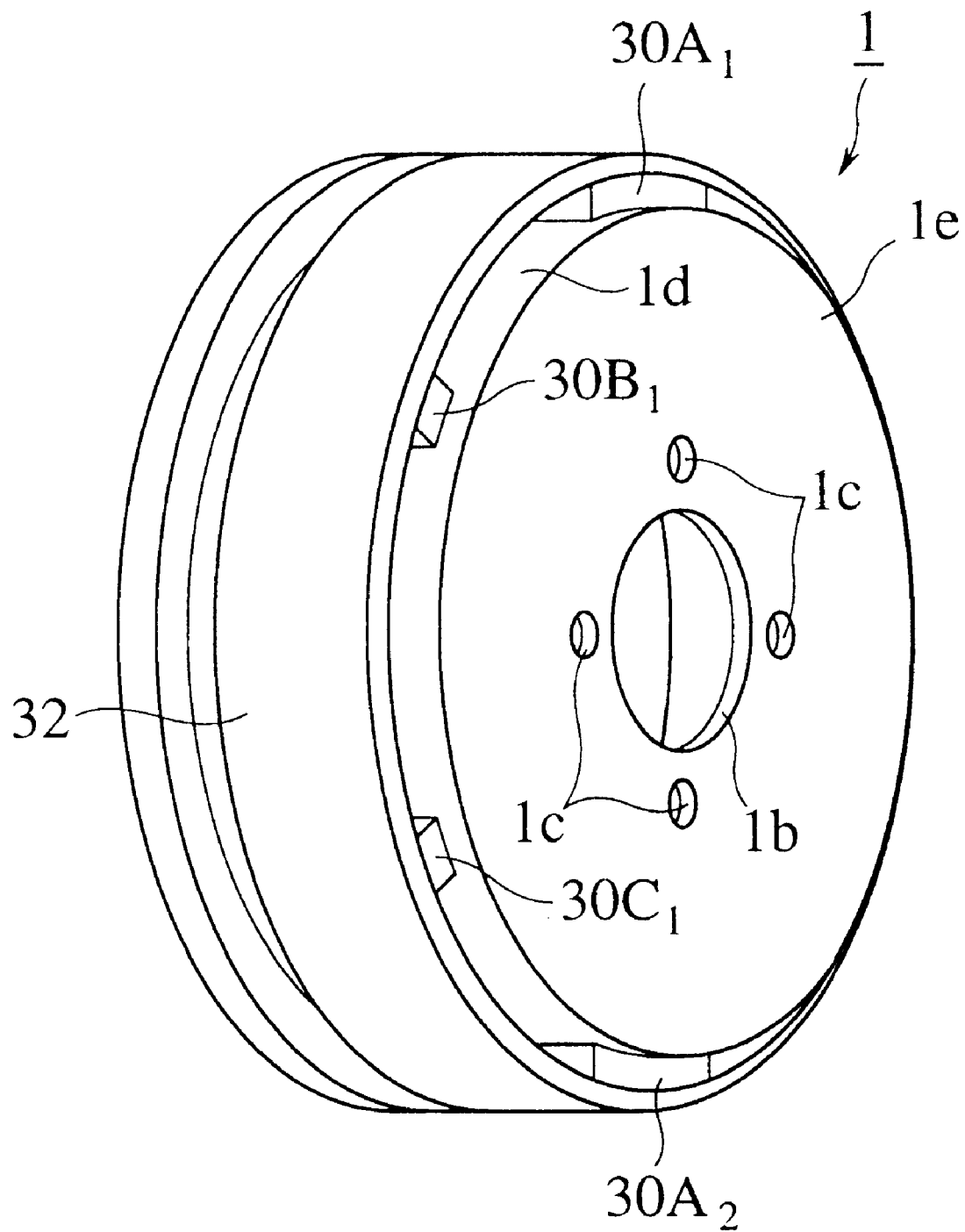
FIG. 26 is a perspective view showing a brake drum according to a ninth embodiment of the present invention.
Figure 27:
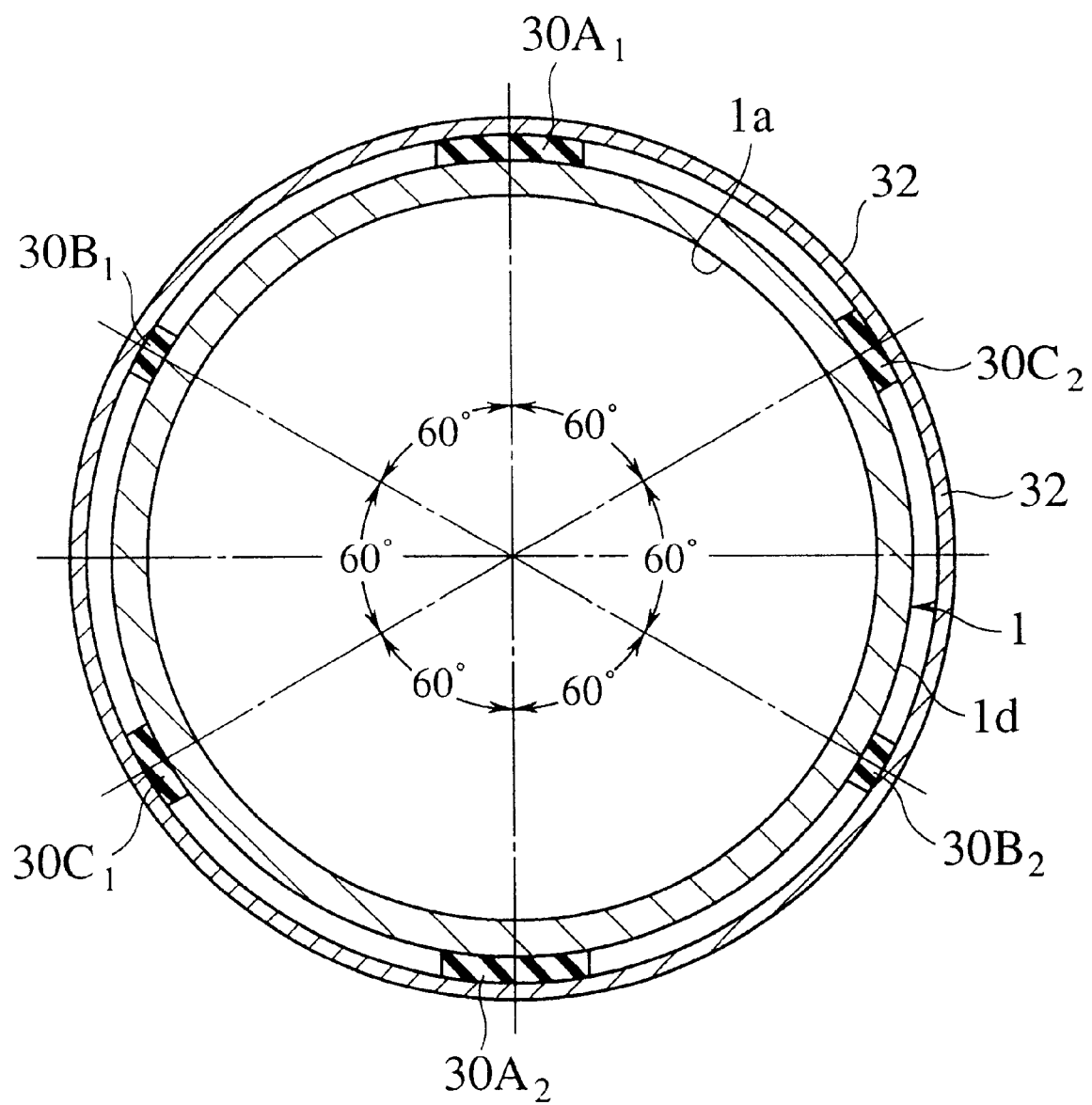
FIG. 27 is a sectional view showing an axially central portion of the brake drum according to the ninth embodiment in FIG. 26.

FIGS. 26 and 27 are views showing a brake drum according to a ninth embodiment of the present invention. FIG. 26 is a perspective view showing the brake drum 1 according to the ninth embodiment. FIG. 27 is a lateral sectional view showing an axially central portion of the brake drum 1 according to the ninth embodiment. Like references used in the above embodiments are labeled to the like parts in them, and their redundant descriptions are omitted.

In other words, in the ninth embodiment, an annular metal member 32 like a short cylinder is provided coaxially with the brake drum 1 to enclose the outer peripheral surface $1d$ of the brake drum 1, and the elastic members $30A_1$ to $30C_2$ are intervened between the outer peripheral surface $1d$ of the brake drum 1 and an inner peripheral surface of the annular member 32. The elastic members $30A_1$ to $30C_2$ are intervened between the outer peripheral surface $1d$ of the brake drum 1 and an inner peripheral surface of the annular member 32 in its compressed state by being pushed into the outer peripheral surface $1d$ while being contacted with the inner peripheral surface of the annular member 32.

A dimension of an outside diameter of the annular member 32 is formed smaller than inside diameters of the rim 12A and the wheel disk 12B. The rim 12A encloses the annular member 32. Therefore, the annular member 32 is positioned not to contact to the road wheel 12.

Profiles and arrangement locations of the elastic members $30A_1$ to $30C_2$ are similar to those in the seventh embodiment.

According to such structure, since the elastic members $30A_1$ to $30C_2$ intervened between the outer peripheral surface $1d$ and the annular member 32 may show similar operations to those in the seventh embodiment, similar advantages to those in the seventh embodiment can be accomplished. Moreover, in the ninth embodiment, working of the road wheel 12, for example, is not needed at all to arrange the elastic members $30A_1$ to $30C_2$. Even if the inside diameter of the road wheel 12, etc. are modified due to the exchange of the wheel by the user of the vehicle, for example, particular workings or treatings are not required. Therefore, the ninth embodiment is advantageous in cost, and the ninth embodiment may be easily applied to the existing drum brake.

In the ninth embodiment, the annular member 32 has been provided to enclose the outer peripheral surface $1d$ of the brake drum 1. However, the annular member 32 is not limited to this. Instead, first a thin plate-like ring member as the annular member may be arranged coaxially with the brake drum 1 to oppose to an outer surface of the bottom $1e$ and the elastic members $30A_1$ to $30C_2$ may then be intervened between the outer surface of the bottom $1e$ and the annular member.

Tenth Embodiment

Figure 28:
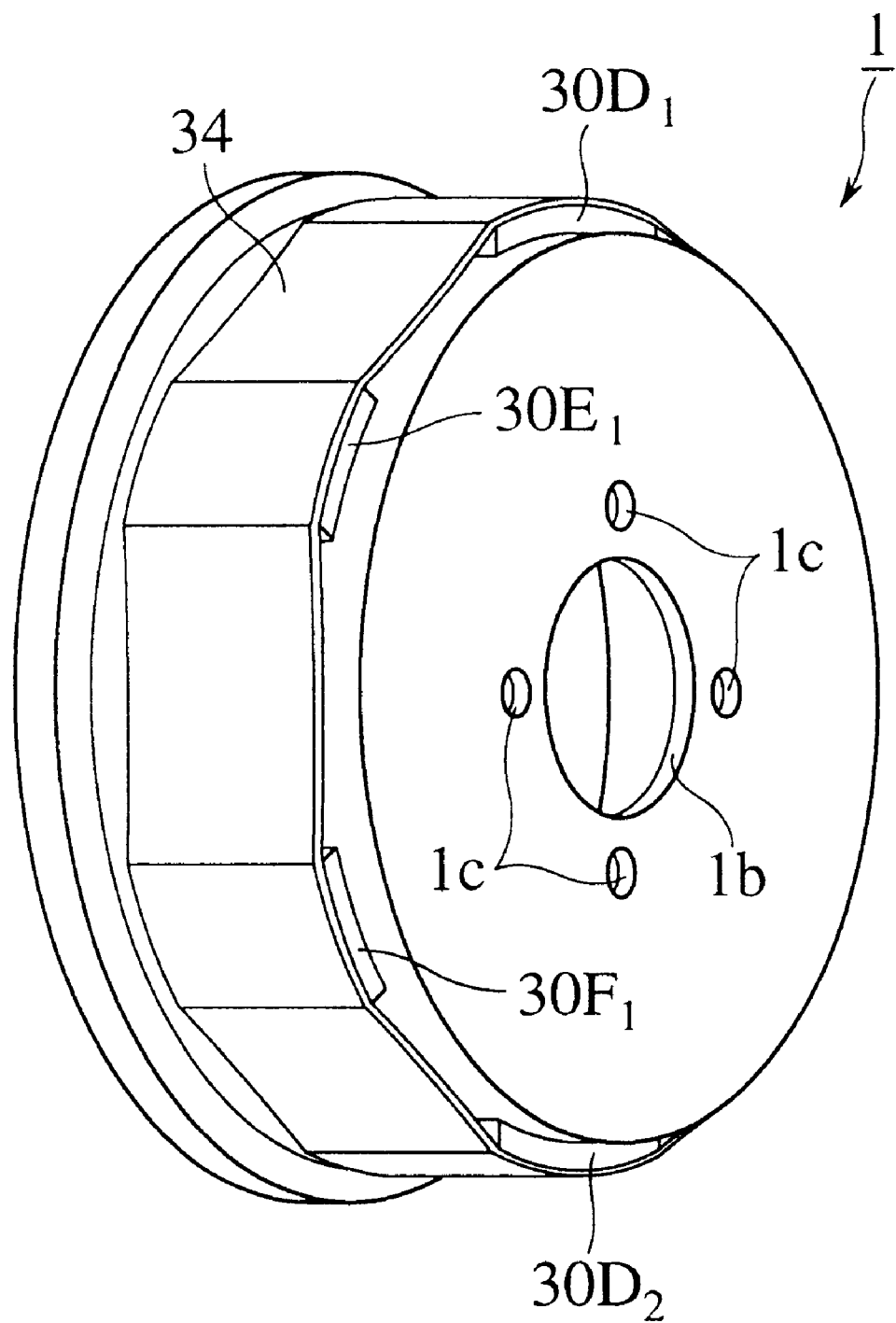
FIG. 28 is a perspective view showing a brake drum according to a tenth embodiment of the present invention.
Figure 29:
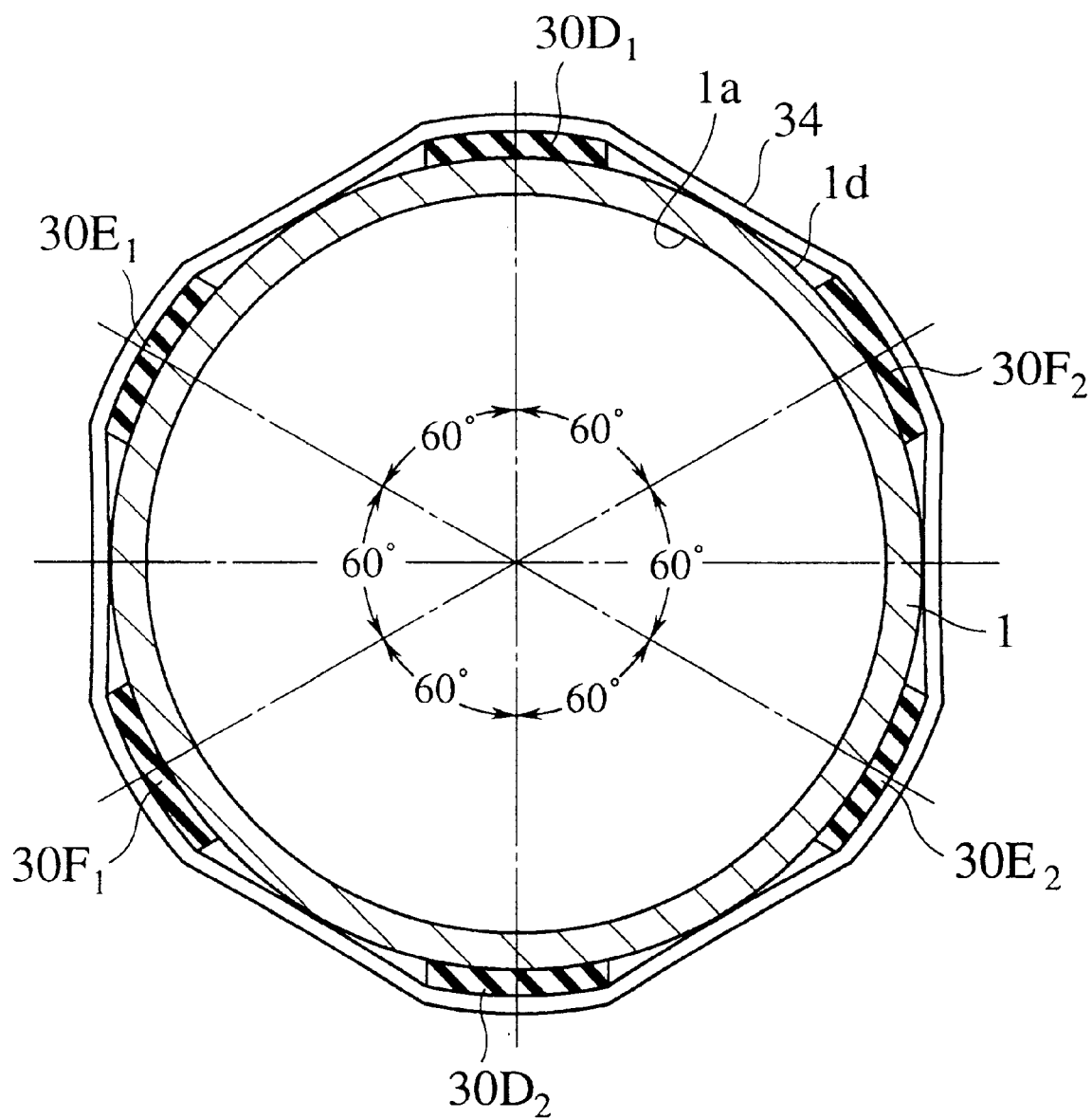
FIG. 29 is a sectional view showing an axially central portion of the brake drum according to the tenth embodiment in FIG. 28.
Figure 30:
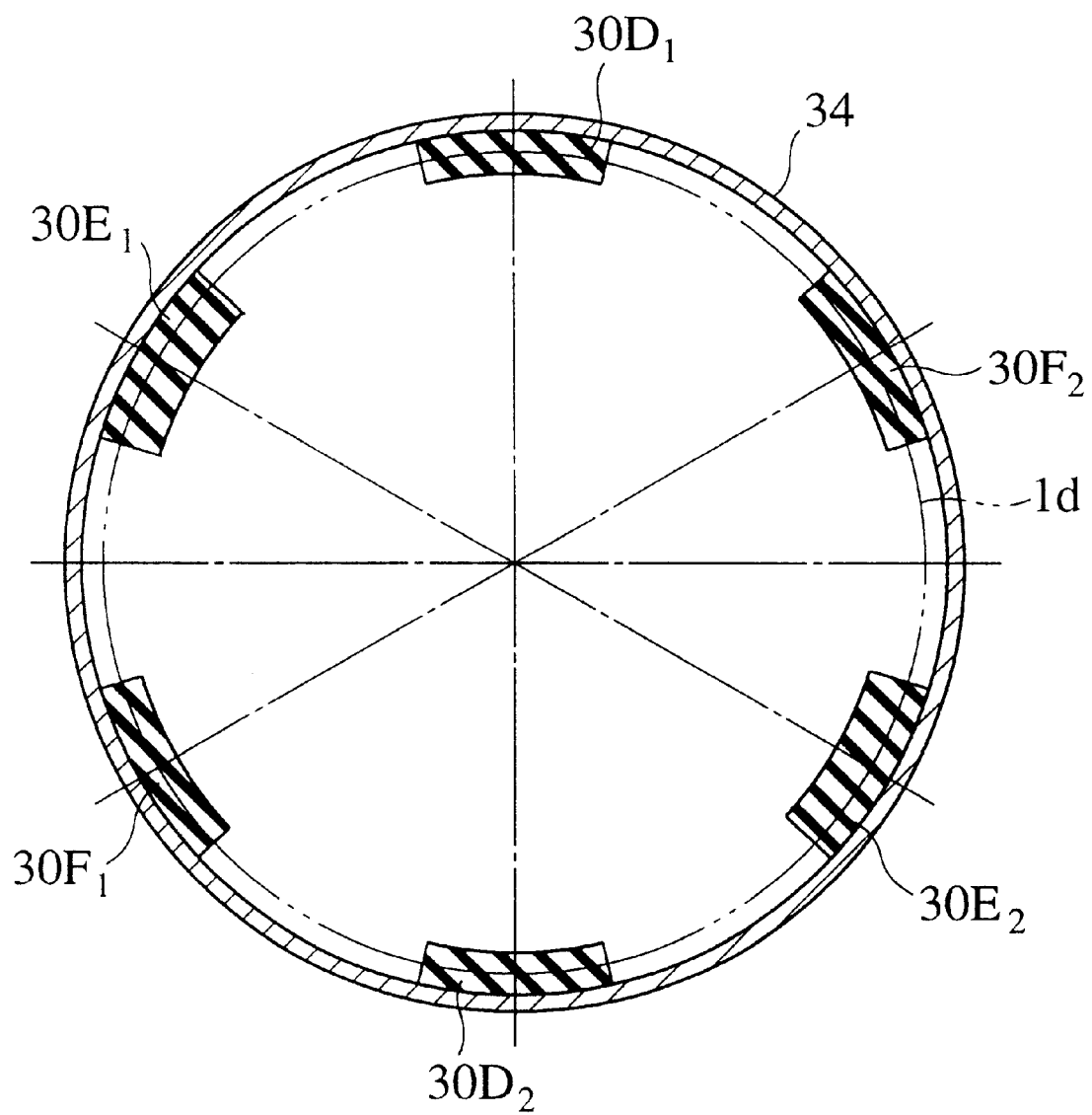
FIG. 30 is a sectional view showing a belt used in the tenth embodiment.

FIGS. 28 to 30 are views of a brake drum according to a tenth embodiment of the present invention. FIG. 28 is a perspective view showing the brake drum 1 according to the tenth embodiment. FIG. 29 is a lateral sectional view showing the axially central portion of the brake drum 1 according to the tenth embodiment. Like references used in the above embodiments are labeled to the like parts in them, and their redundant descriptions are omitted.

More specifically, in the tenth embodiment, a thin steel plate belt 34 is provided as an annular member which has a diameter slightly larger than the outside diameter of the brake diameter 1. Six elastic members $30D_1$ to $30F_2$ are intervened between an inner surface of the belt 34 and the outer peripheral surface $1d$ of the brake drum 1 in its compressed state.

In more detail, as shown in FIG. 30 being a front sectional view of the belt 34 released from the brake drum 1, the elastic members $30D_1$ to $30F_2$ are adhered on an inner surface of the belt 34 at six locations separated at an equal distance in the circumferential direction. The elastic members $30D_1$ and $30D_2$, $30E_1$ and $30E_2$, and $30F_1$ and $30F_2$, are each opposed symmetrically to each other with respect to the center axis, and are classified into groups respectively. The elastic members belonging to each group are formed of the same elastic material, but they are formed of different elastic material between respective groups. A thickness of each of the elastic members $30D_1$ to $30F_2$ are selected so as to be compressed and deformed when they are fitted to the brake drum 1, i.e., to have a dimension slightly inside rather than the outer peripheral surface $1d$ of the brake drum 1, as shown by a chain double-dashed line in FIG. 30. Accordingly, when the belt 34 to which the elastic members $30D_1$ to $30F_2$ are assembled to the brake drum 1, the belt 34 assumes a substantially flat state instead of a circular shape owing to tensile forces between the elastic members $30D_1$ to $30F_2$, as shown in FIGS. 28 and 29.

According to the above structure, since the elastic members $30D_1$ to $30F_2$ intervened between the outer peripheral surface $1d$ and the belt 34 may show similar operations to those in the seventh embodiment, similar advantages to those in the seventh embodiment can be attained. Like the tenth embodiment, the ninth embodiment is advantageous in cost, and may be readily applied to the existing drum brake.

Furthermore, since the belt 34 formed of the thin steel plate is used, the brake drum 1 is manufactured lighter than the ninth embodiment and therefore unnecessary increase in moment of inertia of the wheel can be avoided. As a result, there is an advantage that the brake noises can be prevented without affecting power performance such as accelerating performance.

Eleventh Embodiment

Figure 31:
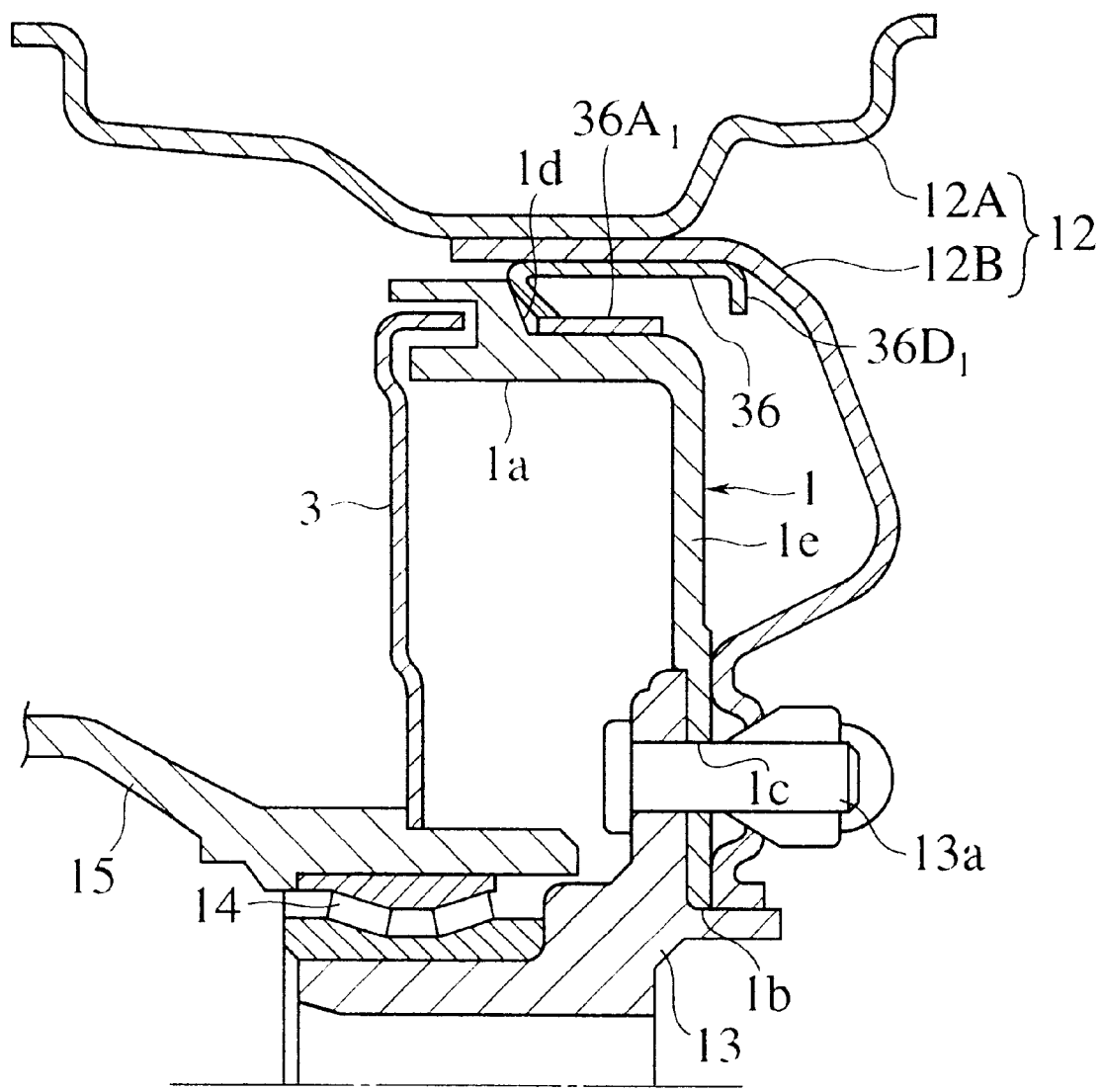
FIG. 31 is a sectional view showing a structure of a drum brake according to an eleventh embodiment of the present invention.
Figure 32:
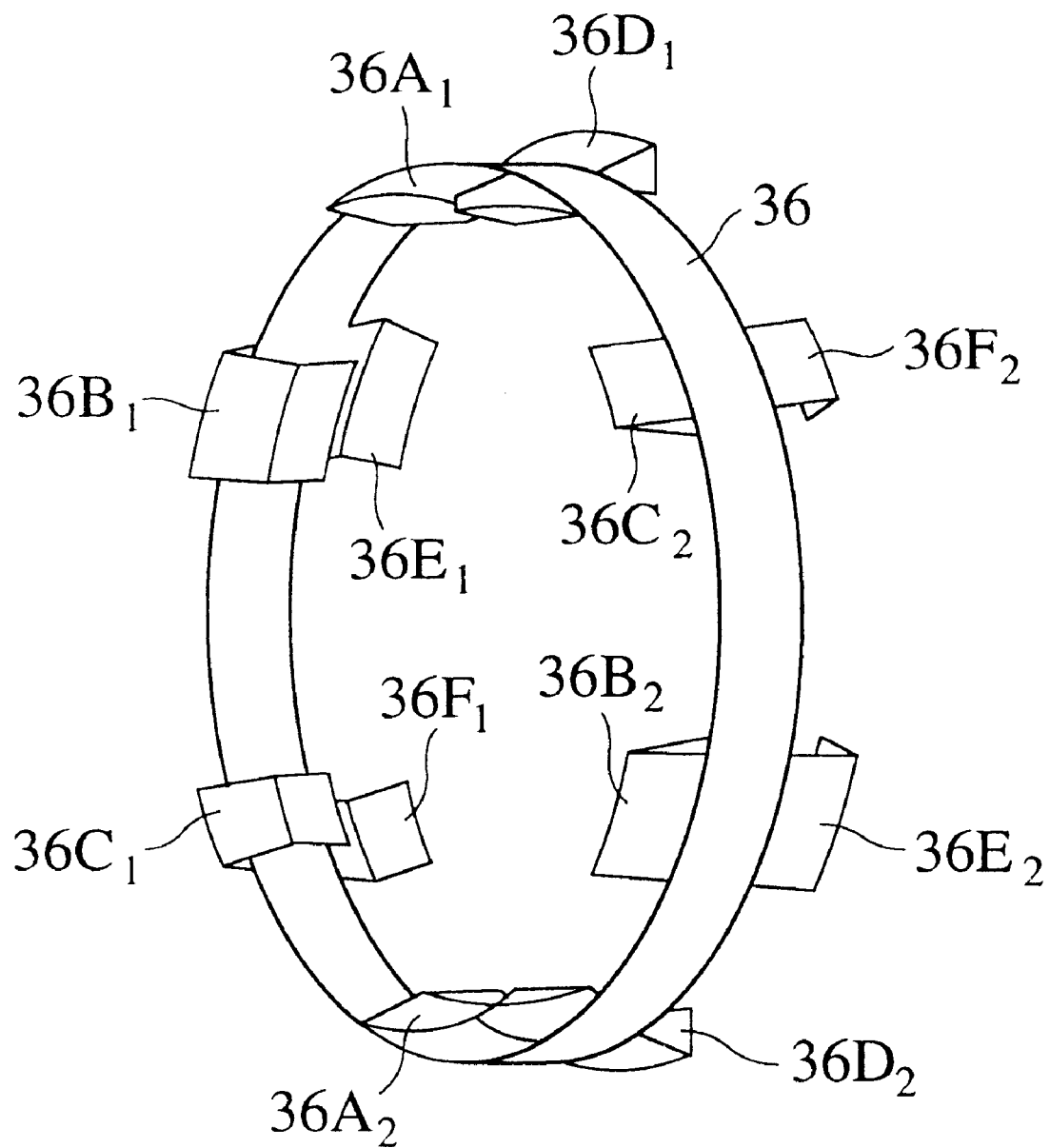
FIG. 32 is a perspective view showing a ring used in the eleventh embodiment in FIG. 31.

FIGS. 31 and 32 are views showing a drum brake according to an eleventh embodiment of the present invention. FIG. 31 is a sectional view showing a structure of the drum brake according to the eleventh embodiment. Like references used in the above embodiments are labeled to the like parts in them, and their redundant descriptions are omitted.

More specifically, in the eleventh embodiment, a metal ring 36 as a cylindrical member which has a diameter slightly larger than an outside diameter of the brake drum 1 is provided. Six pawl portions $36A_1$ to $36C_2$ having an identical length separated at an equal distance in the circumferential direction are formed on one edge of the ring 36 integrally with the ring 36 so as to extend outwardly from the edge portion. Six pawl portions $36D_1$ to $36F_2$ having an identical length separated at an equal distance in the circumferential direction are formed on the other edge of the ring 36 integrally with the ring 36 in coincidence with the pawl portions $36A_1$ to $36C_2$ so as to extend outwardly from the edge portion. However, the pawl portions $36D_1$ to $36F_2$ are formed slightly shorter than the pawl portions $36A_1$ to $36C_2$. As for the pawl portions $36A_1$ to $36C_2$ formed on one edge portion, the pawl portions $36A_1$ and $36A_2$, $36B_3$ and $36B_2$, and $36C_1$ and $36C_2$, each oppose symmetrically to each other with respect to the center axis of the ring 36, are classified into groups respectively. The pawl portions belonging to each group are formed to have an identical width, but they are formed to have a different width between respective groups. Similarly, as for the pawl portions $36D_1$ to $36F_2$ formed on the other edge portion, the pawl portions $36D_1$ and $36D_2$, $36E_1$ and $36E_2$, and $36F_1$ and $36F_2$, each oppose symmetrically to each other with respect to the center axis of the ring 36, are classified into groups respectively. The pawl portions belonging to each group are formed to have an identical width, but they are formed to have a different width between respective groups.

Top end portions of the pawl portions $36A_1$ to $36C_2$ are bent toward the inside of the ring 36 like substantial U-shape in section. Top end portions of base portions of the pawl portions $36D_1$ to $36F_2$ located on the ring 36 side are bent at an obtuse angle to be lifted up slightly outwardly in the radial direction of the ring 36. The top end portions of the pawl portions $36D_1$ to $36F_2$ are bent at about 90 degree inwardly in the radial direction of the ring 36.

As shown in FIG. 32, the ring 36 is intervened between the outer peripheral surface $1d$ of the brake drum 1 and the inner peripheral surface of the wheel disk 12B. At that time, the pawl portions $36A_1$ to $36C_2$ bent like substantial U-shape in section abut to the outer peripheral surface $1d$ in such a degree that the top edge portions are crashed like a U-shape while their bent portions are directed to the inside of the vehicle. At the same time, the pawl portions $36D_1$ to $36F_2$ abut to the inner peripheral surface of the wheel disk 12B in such a degree that bent portions of the base portions become substantially flat.

Consequently, the pawl portions $36A_1$ to $36F_2$ may serve substantially as the elastic members of the present invention.

In the above structure, since dimensions of respective pawl portions $36A_1$ to $36F_2$ are set as set forth above, a resultant center of gravity of these pawl portions $36A_1$ to $36F_2$ is located at the center axis of rotation of the brake drum 1. Therefore, if the brake drum 1 rotates together with the wheel at high speed, the rotational balance is not lost.

The pawl portions $36A_1$ to $36F_2$ have identical rigidity in the above groups since their widths are adjusted, but they have different rigidity between respective groups. Therefore, the pawl portions $36A_1$ to $36F_2$ can be regarded substantially identically as the elastic members $30A_1$ to $30C_2$ in the seventh embodiment. Accordingly, advantages which are similar to those in the seventh embodiment can be obtained.

In the eleventh embodiment, since the elastic members are implemented by metal spring in place of rubber-like elastic bodies, a possibility can be extremely reduced that the elastic members are degraded by frictional heat generated at the time the brake is operated. Thus there is an advantage that durability can be improved. In addition, since the pawl portions $36A_1$ to $36F_2$ constituting the elastic member are integral with the ring 36, there is no need to stick the rubber-like elastic members to the outer peripheral surface $1d$ or the inner peripheral surface of the annular member 32, as in the seventh to tenth embodiments. Therefore, efficiency can be improved since adhesion or alignment can be neglected at the time of manufacturing.

In the seventh to tenth embodiments, although the elastic members of the present invention are formed of the rubber elastic member, they are not restricted to this. They may be formed of either metal elastic member as in the tenth embodiment or synthetic resin elastic member.

Arrangement patterns are not limited to those in the seventh to eleventh embodiments. In other words, if the elastic members are set to correspond to the thick portions and the thin portions in the first to sixth embodiments and then mass relations between these thick portions and thin portions are replaced with rigidity relations between the elastic members, arrangement patterns of these thick portions and thin portions in the first to sixth embodiments can be applied as arrangement patterns of the elastic members as they are. Therefore, similar advantages to those in the first to sixth embodiments can be achieved.

In addition, the number of the elastic member is not restricted to six, the number may be selected to be less than five or more than seven.

What is claimed is:

1. A rotating cooling wheel for a brake, comprising:

a plurality of circumferentially spaced structural portions formed circumferentially around the wheel, at least four of the structural portions being structurally non-uniform relative to each other in at least one of mass and rigidity, wherein said structural portions are divided into a plurality of groups, each group having at least two structural portions whose structural characteristics match, wherein the structural portions of each group whose structural characteristics match are spaced apart at equal circumferential distances relative to each other, and wherein the structural portions of the different groups are spaced apart at different circumferential distances.

2. A rotating cooling wheel for a brake according to claim 1, wherein one of the structural portions is shared by all of the groups.

3. A rotating cooling wheel for a brake according to claim 1, wherein one of the structural portions is shared by all of the groups and another one of the structural portions is shared by two of the groups.

4. A rotating cooling wheel for a brake according to claim 1, wherein any three consecutively situated ones of the structural portions are structurally dissimilar to each other.

5. A rotating cooling wheel for a brake, comprising:

a plurality of circumferentially spaced structural portions formed in at least N circumferential locations of the wheel, where N is a non-prime number equal to or greater than six, at least three of the structural portions being structurally non-uniform in at least one of mass and rigidity, wherein the structural portions are divided into M groups, where M is a natural number divisor of N other than 1 or N, each group having N/M structural portions whose structural characteristics match, wherein the structural portions of each group are spaced apart at equal circumferential distances relative to each other, and wherein any three consecutively situated ones of the structural portions are structurally dissimilar to each other.

6. A rotating cooling wheel for a brake, comprising:

a plurality of circumferentially spaced structural portions formed in at least N circumferential locations of the wheel, where N is an even number equal to or greater than six, at least three of the structural portions being structurally non-uniform in at least one of mass and rigidity, wherein all of the structural portions are spaced apart at equal circumferential distances relative to each other, wherein any two diametrically oppositely disposed ones of the structural portions have structural characteristics that match, and wherein any three consecutively situated ones of the structural portions are structurally dissimilar to each other.

7. A rotating cooling wheel for a brake according to claim 6, wherein the structural portions are divided into N/2 groups, and wherein any structural portion of any N/2 group has structural characteristics that are dissimilar from any structural portion of any other N/2 group.

8. A method of manufacturing a rotating cooling wheel for a brake, comprising:

setting a non-prime number N equal to or greater than six and a natural number M, other than 1 or N, by which N is divisible;

forming a plurality of circumferentially spaced structural portions in at least N circumferential locations of the wheel, with at least three of the structural portions formed structurally non-uniform in at least one of mass and rigidity;

forming M groups of N/M structural portions;

spacing the structural portions of each group at equal circumferential distances relative to each other; and forming any three consecutively situated ones of the structural portions to be structurally dissimilar to each other.

9. A method of manufacturing a rotating cooling wheel for a brake, comprising:

defining N circumferential locations corresponding to a plurality of circumferentially spaced structural portions of the wheel, where N is a non-prime number equal to or greater than six, with at least three of the structural portions formed structurally non-uniform in at least one of mass and rigidity;

forming the structural portions circumferentially around the wheel at N locations while spacing all of the structural portions at equal circumferential distances; and forming all of the diametrically oppositely disposed ones of the structural portions to have structural characteristics that match and any three consecutively situated ones of the structural portions to be structurally dissimilar to each other.

10. A method according to claim 9, further comprising dividing the structural portions into N/2 groups, and forming any structural portion of any N/2 group to have structural characteristics that are dissimilar from any structural portion of any other N/2 group.

* * * * *